(12) United States Patent
Iwasaki

(10) Patent No.: US 11,243,741 B2
(45) Date of Patent: Feb. 8, 2022

(54) DISPLAY CONTROL DEVICE AND DISPLAY CONTROL METHOD

(71) Applicant: Mitsubishi Electric Corporation, Tokyo (JP)

(72) Inventor: Tomohiro Iwasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/967,448

(22) PCT Filed: Feb. 21, 2018

(86) PCT No.: PCT/JP2018/006134
§ 371 (c)(1),
(2) Date: Aug. 5, 2020

(87) PCT Pub. No.: WO2019/163011
PCT Pub. Date: Aug. 29, 2019

(65) Prior Publication Data
US 2021/0216275 A1      Jul. 15, 2021

(51) Int. Cl.
*G06F 3/16*          (2006.01)
*G06F 3/0482*      (2013.01)
(Continued)

(52) U.S. Cl.
CPC ............ *G06F 3/167* (2013.01); *G06F 3/0482* (2013.01); *G06F 3/1423* (2013.01); *G10L 15/22* (2013.01);
(Continued)

(58) Field of Classification Search
CPC ...... G06F 3/167; G06F 3/0482; G06F 3/1423; G10L 15/22; G10L 15/30
(Continued)

(56) References Cited

U.S. PATENT DOCUMENTS 9,129,291 B2 *   9/2015   Goldstein ............... G10L 15/22
10,949,228 B1 *   3/2021   Graham ............ H04M 1/72403
(Continued)

FOREIGN PATENT DOCUMENTS

JP          7-140398 A      6/1995
JP        11-175094 A      7/1999
(Continued)

OTHER PUBLICATIONS

Japanese Office Action for Japanese Application No. 2020-501891, dated Feb. 9, 2021, with English translation.
(Continued)

*Primary Examiner* — William D Titcomb
(74) *Attorney, Agent, or Firm* — Birch, Stewart, Kolasch & Birch, LLP

(57) ABSTRACT

Provided is a display control device to perform, on a display device having display regions in which a plurality of applications each are displayed, display control based on a speech content of a spoken voice. A display controller of the display control device acquires first information allowing identification of at least one application related to the speech content from among the plurality of applications and second information allowing identification of at least one processing target in processing to be performed by the at least one application. The at least one processing target is related to the speech content. The display controller performs control to cause, in a display region identified based on the first information, the at least one processing target identified based on the second information. The at least one processing target is a processing target in processing to be performed by the application to be displayed.

8 Claims, 29 Drawing Sheets

(51) Int. Cl.
*G06F 3/14* (2006.01)
*G10L 15/22* (2006.01)
*G10L 15/30* (2013.01)

(52) U.S. Cl.
CPC .... *G10L 15/30* (2013.01); *G06F 2203/04803* (2013.01); *G10L 2015/223* (2013.01)

(58) Field of Classification Search
USPC ........................................................ 715/728
See application file for complete search history.

(56) References Cited

U.S. PATENT DOCUMENTS

| 10,972,607 B1* | 4/2021 | Graham ............... H04M 3/5183 |
| 2010/0076793 A1* | 3/2010 | Goldstein .............. G06Q 40/08 |
| | | 705/4 |
| 2012/0045945 A1 | 9/2012 | Miyauchi et al. |
| 2012/0245945 A1* | 9/2012 | Miyauchi ................ G10L 15/06 |
| | | 704/275 |
| 2014/0309870 A1* | 10/2014 | Ricci .................... A61B 5/6808 |
| | | 701/36 |
| 2017/0274909 A1* | 9/2017 | Nishihashi ............ B60W 50/12 |

FOREIGN PATENT DOCUMENTS

| JP | 2008-164809 A | 7/2008 |
| JP | 2012-213132 A | 11/2012 |
| JP | 2014-178567 A | 9/2014 |
| JP | 2016-62129 A | 4/2016 |

OTHER PUBLICATIONS

International Search Report (PCT/ISA/210) issued at PCT/JP2018134 dated Apr. 24, 2018.

* cited by examiner

F I G. 1
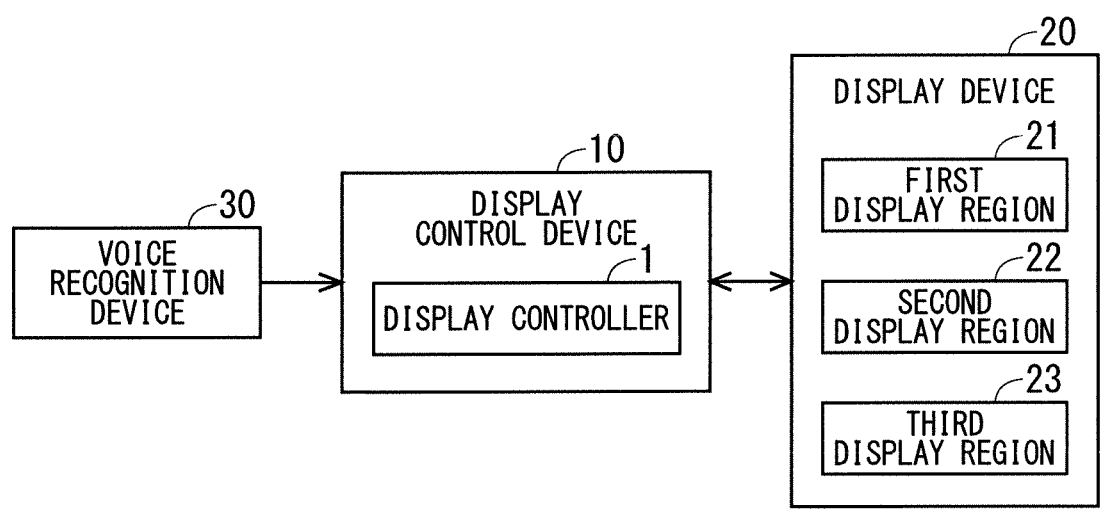
F I G. 2
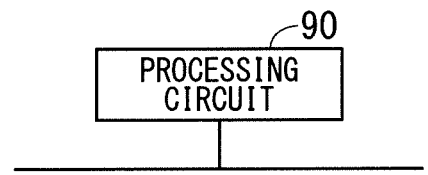
F I G. 3
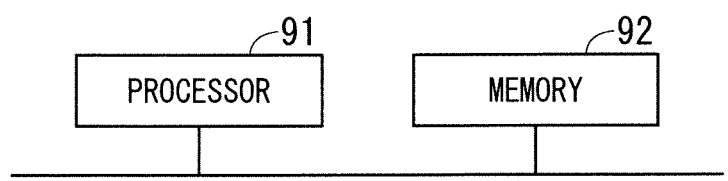

FIG. 8
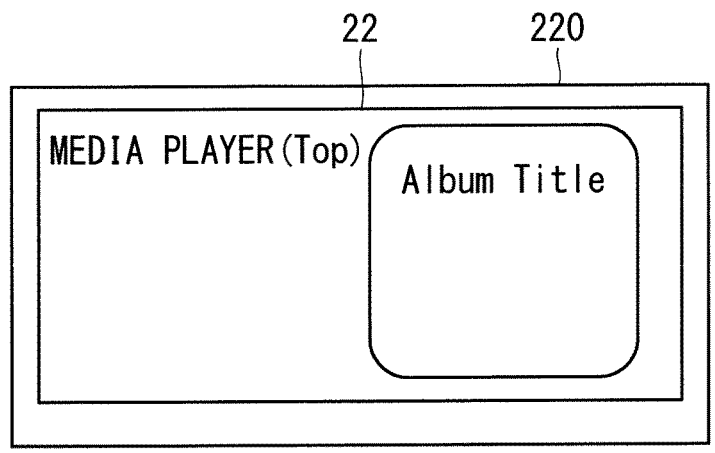
FIG. 9
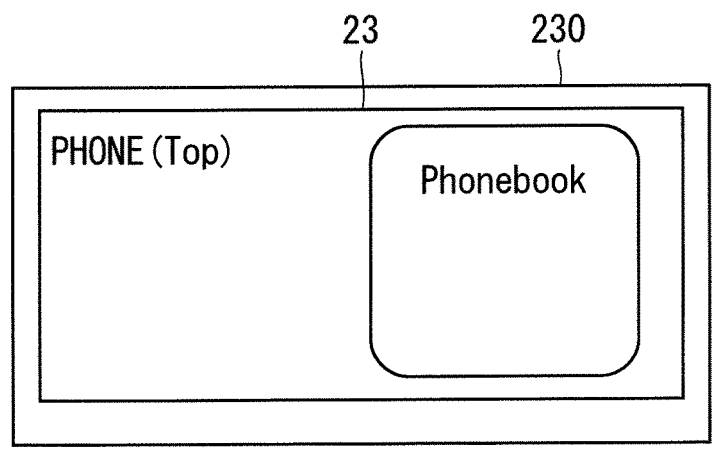
FIG. 10
| DISPLAY | APPLICATION |
|---|---|
| FIRST DISPLAY REGION | NAVIGATION |
| SECOND DISPLAY REGION | MEDIA PLAYER |
| THIRD DISPLAY REGION | PHONE |

FIG. 11

| SPEECH CONTENTS | TOPIC | SLOT |
|---|---|---|
| John Smith, Navigate to John Smith | NAV.navigateName | John Smith |
| Josh Smith, Navigate to Josh Smith | | Josh Smith |
| Joan Smith, Play Joan Smith | MPL.playArtist | Joan Smith |
| Josh Smith, Play Josh Smith | | Josh Smith |
| Joe Smith, Call Joe Smith | PHN.callName | Joe Smith |
| Josh Smith, Call Josh Smith | | Josh Smith |

FIG. 12

| SPEECH CONTENTS | TOPIC | SLOT |
|---|---|---|
| Number one, Select number one | CMD.selectNbest | Number one |
| Number two, Select number two | | Number two |
| Number three, Select number three | | Number three |
| Number four, Select number four | | Number four |
| Number five, Select number five | | Number five |
| Number six, Select number six | | Number six |

FIG. 13

| TOPIC | APPLICATION |
|---|---|
| NAV.navigateName | NAVIGATION |
| MPL.playArtist | MEDIA PLAYER |
| PHN.callName | PHONE |

F I G. 1 6

| ID | TOPIC | SLOT | APPLICATION |
|----|-------|------|-------------|
| 1 | NAV.navigateName | John Smith | NAVIGATION |
| 2 | NAV.navigateName | Josh Smith | NAVIGATION |

F I G. 1 9
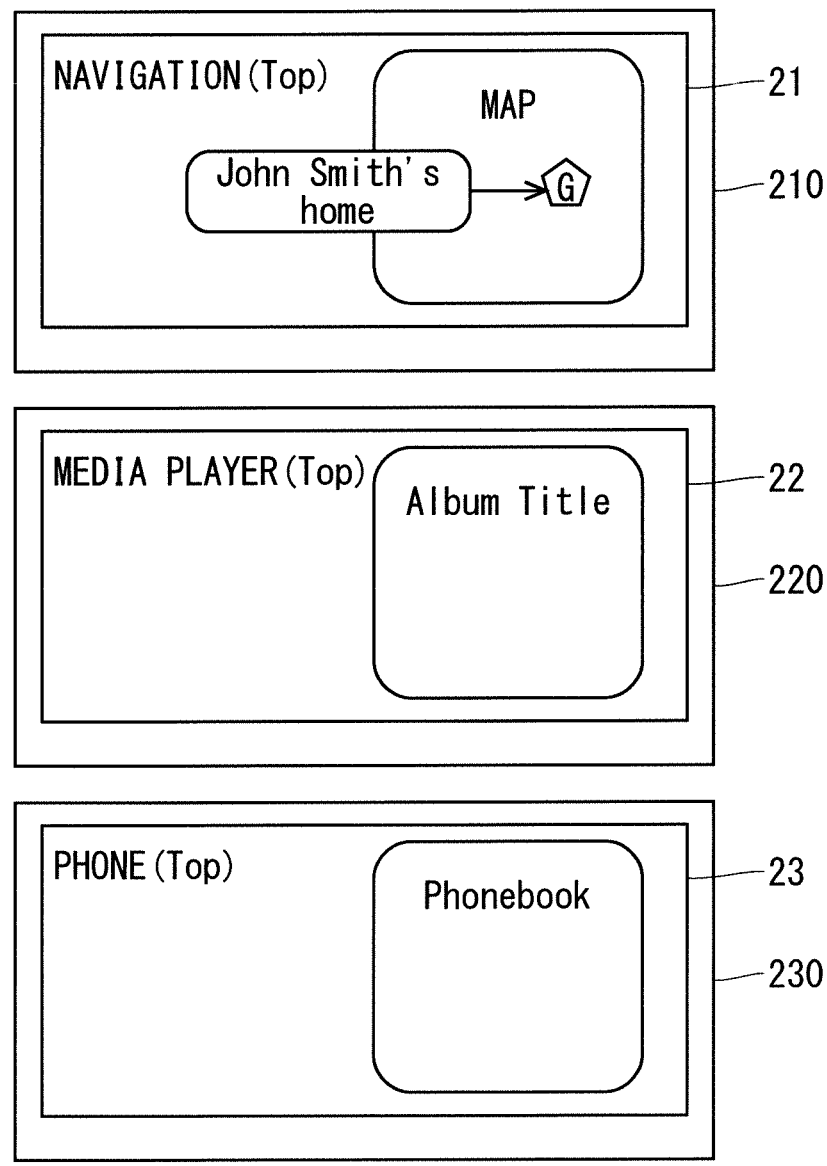

FIG. 21

| ID | TOPIC | SLOT | APPLICATION |
|----|---------------|------------|--------------|
| 1  | MPL.playArtist | Joan Smith | MEDIA PLAYER |
| 2  | MPL.playArtist | Josh Smith | MEDIA PLAYER |

FIG. 25

| ID | TOPIC | SLOT | APPLICATION |
|----|-------------|------------|-------------|
| 1  | PHN.callName | Joe Smith  | PHONE       |
| 2  | PHN.callName | Josh Smith | PHONE       |

F I G. 3 0

| ID | TOPIC | SLOT | APPLICATION |
|----|-------|------|-------------|
| 1 | NAV.navigateName | John Smith | NAVIGATION |
| 2 | NAV.navigateName | Josh Smith | NAVIGATION |
| 3 | MPL.playArtist | Joan Smith | MEDIA PLAYER |
| 4 | MPL.playArtist | Josh Smith | MEDIA PLAYER |
| 5 | PHN.callName | Joe Smith | PHONE |
| 6 | PHN.callName | Josh Smith | PHONE |

DISPLAY CONTROL DEVICE AND DISPLAY CONTROL METHOD

TECHNICAL FIELD

The present invention relates to display control devices and display control methods.

BACKGROUND ART

Systems to provide a variety of information to drivers through displays installed in cockpits of vehicles have increased. For example, Patent Document 1 discloses a vehicle equipment control device. The vehicle equipment control device obtains, as search results, a plurality of control contents associated with a search term included in speech of a user. The vehicle equipment control device also guesses, based on a screen displayed by a display device, operation target equipment that the user intends to operate. The vehicle equipment control device sorts the control contents included in the search results in descending order of the degree of relevance to the operation target equipment, and causes the sorted control contents to be displayed.

PRIOR ART DOCUMENT

Patent Document

Patent Document 1: Japanese Patent Application Laid-Open No. 2016-62129

SUMMARY

Problem to be Solved by the Invention

The vehicle equipment control device disclosed in Patent Document 1 displays, on a single screen, a list of the control contents related to a plurality of applications as the search results. It is therefore difficult for the user to instantaneously determine applications corresponding to the respective control contents. The vehicle equipment control device displays, along with the control contents, names of the applications corresponding thereto within a screen, so that the number of characters might exceed the upper limit of the number of characters capable of being displayed by the display device for each line.

The present invention has been conceived to solve a problem as described above, and it is an object of the present invention to provide a display control device to perform control to cause a display device to display, in a display region of the display device in which an application related to a speech content is displayed, a processing target in processing to be performed by the application. The processing target is related to the speech content.

Means to Solve the Problem

A display control device according to the present invention is a display control device to perform, on a display device having display regions in which a plurality of applications each are displayed, display control based on a speech content of a spoken voice. The display control device includes a display controller. The display controller acquires first information allowing identification of at least one application related to the speech content from among the plurality of applications and second information allowing identification of at least one processing target in processing to be performed by the at least one application. The at least one processing target is related to the speech content. The display controller performs control to cause the display device to display, in a display region to display the at least one application identified based on the first information, the at least one processing target identified based on the second information as a recognition candidate. The at least one processing target is a processing target in processing to be performed by the at least one application.

Effects of the Invention

According to the present invention, the display control device to perform control to cause the display device to display, in the display region of the display device in which the application related to the speech content is displayed, the processing target in processing to be performed by the application can be provided. The processing target is related to the speech content The objects, features, aspects, and advantages of the present invention will become more apparent from the following detailed description and the accompanying drawings.

BRIEF DESCRIPTION OF DRAWINGS

FIG. 1 is a block diagram showing configurations of a display control device and devices operating in relation to the display control device in Embodiment 1.

FIG. 2 shows one example of a processing circuit included in the display control device in Embodiment 1.

FIG. 3 shows another example of the processing circuit included in the display control device in Embodiment 1.

FIG. 8 shows a second display region of a second display unit in Embodiment 2.

FIG. 9 shows a third display region of a third display unit in Embodiment 2.

FIG. 10 shows display region information in Embodiment 2.

FIG. 11 shows spoken voices recognized in response to command speech, topics, and slots in Embodiment 2.

FIG. 12 shows spoken voices recognized in response to candidate selection speech, a topic, and slots in Embodiment 2.

FIG. 13 shows a correspondence between the topics and applications in Embodiment 2.

FIG. 16 shows a relationship between processing targets and identification symbols in Embodiment 2.

FIG. 19 shows a state of a screen during performance of processing being displayed in the first display region in Embodiment 2.

FIG. 21 shows a relationship between processing targets and the identification symbols in Embodiment 2.

FIG. 25 shows a relationship between processing targets and the identification symbols in Embodiment 2.

FIG. 30 shows a relationship between processing targets and identification symbols in Embodiment 3.

DESCRIPTION OF EMBODIMENTS

Embodiment 1

(Configuration of Display Control Device)

Figure 4:
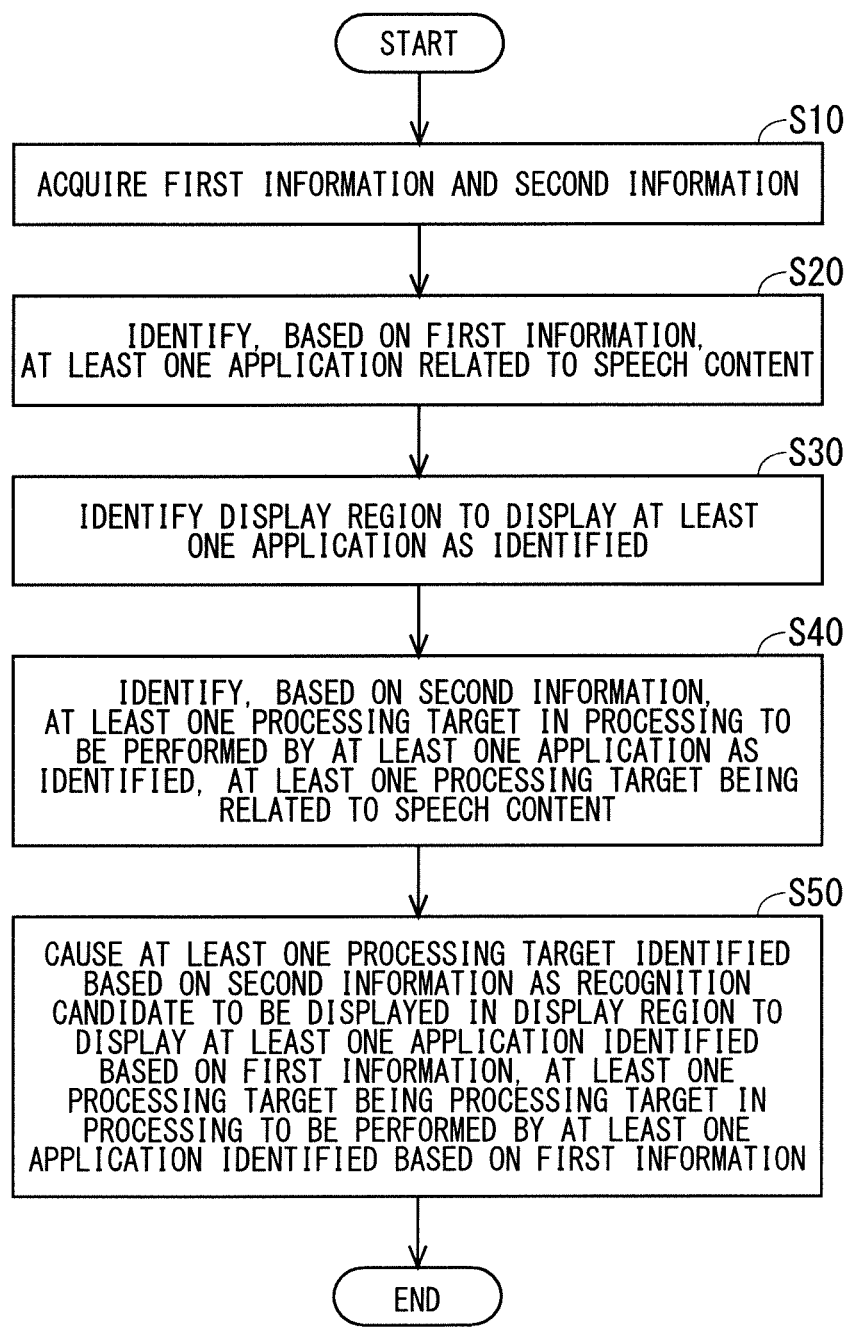
FIG. 4 is a flowchart showing operation of the display control device in Embodiment 1.

FIG. 1 is a block diagram showing configurations of a display control device 10 and devices operating in relation to the display control device 10 in Embodiment 1.

The display control device 10 is a display control device to perform, on a display device 20 having display regions in which a plurality of applications each are displayed, display control based on a speech content of a spoken voice.

The display device 20 has the plurality of display regions. The plurality of applications are respectively displayed in the plurality of display regions corresponding thereto. That is to say, a single application is displayed in each of the display regions. Each of the display regions is, for example, a window. The display device 20 may be a multi-display including a plurality of display units having respective display regions. The display device 20 may have a configuration in which a single display device has a plurality of display regions. That is to say, the display device 20 may have the configuration in which windows corresponding to the respective applications are displayed at different locations within the display device 20. In Embodiment 1, the display device 20 has the first display region 21, the second display region 22, and the third display region 23. The number of display regions is not limited to three.

A voice recognition device 30 recognizes a voice spoken by a user, and outputs the first information and the second information to the display control device 10. The first information is information allowing identification of at least one application related to the speech content from among the applications. The second information is information allowing identification of at least one processing target in processing to be performed by the at least one application identified by the first information. The at least one processing target is related to the speech content. The spoken voice is a result of voice recognition by the voice recognition device 30, and the first information and the second information are results of understanding of intention by the voice recognition device 30. For example, the voice recognition device 30 recognizes, as the result of voice recognition, the spoken voice corresponding to the voice spoken by the user. The voice recognition device 30 also analyzes the spoken voice, and outputs the first information and the second information as the results of understanding of intention. In this case, for example, the voice recognition device 30 references a database in which a plurality of speech contents prepared in advance, the first information and the second information are associated in advance. The voice recognition device 30 acquires to output the first information and the second information corresponding to a speech content actually recognized. The database includes a dictionary in which the speech contents prepared in advance, the first information, and the second information are statistically associated, for example, based on past speech contents.

The display control device 10 includes a display controller 1. The display controller 1 acquires the first information and the second information. The display controller 1 identifies, based on the first information, the at least one application related to the speech content from among the applications. The display controller 1 identifies a display region to display the at least one application identified based on the first information. The display controller 1 also identifies, based on the second information, the at least one processing target related to the speech content. The at least one processing target is a processing target in processing to be performed by the at least one application. The display controller 1 causes the at least one processing target identified based on the second information as a recognition candidate to be displayed in the display region to display the at least one application identified based on the first information. The at least one processing target is a processing target in processing to be performed by the at least one application.

(Processing Circuit)

FIG. 2 shows one example of a processing circuit 90 included in the display control device 10. Functions of the display controller 1 are achieved by the processing circuit 90. That is to say, the processing circuit 90 includes the display controller 1.

When the processing circuit 90 is dedicated hardware, the processing circuit 90 is, for example, a single circuit, a composite circuit, a programmed processor, a parallel-programmed processor, an application specific integrated circuit (ASIC), a field-programmable gate array (FPGA), a circuit as a combination of them, or the like. The functions of the display controller 1 may be achieved separately by a plurality of processing circuits or may be achieved collectively by a single processing circuit.

FIG. 3 shows another example of the processing circuit included in the display control device 10. The processing circuit includes a processor 91 and memory 92. The functions of the display controller 1 are achieved by the processor 91 executing a program stored in the memory 92. For example, the functions are achieved by the processor 91 executing software or firmware described as the program. That is to say, the display control device 10 includes the memory 92 to store the program and the processor 91 to execute the program.

Described in the program is the function of the display control device 10 to acquire the first information allowing identification of the at least one application related to the speech content from among the plurality of applications and the second information allowing identification of the at least one processing target in processing to be performed by the at least one application. The at least one processing target is related to the speech content. Further described in the program is the function of the display control device 10 to cause the display device 20 to display, in the display region to display the at least one application identified based on the first information, the at least one processing target identified based on the second information as the recognition candidate. The at least one processing target is a processing target in processing to be performed by the at least one application. The program is also to cause a computer to implement procedures or methods of the display controller 1.

The processor 91 is, for example, a central processing unit, a processing unit, an arithmetic unit, a microprocessor, a microcomputer, a digital signal processor (DSP), and the like. The memory 92 is, for example, nonvolatile or volatile semiconductor memory, such as random access memory (RAM), read only memory (ROM), flash memory, erasable programmable read only memory (EPROM), and electrically erasable programmable read only memory (EEPROM). The memory 92 may be any storage medium to be used in the future, such as a magnetic disk, a flexible disk, an optical disc, a compact disc, a mini disc, and a DVD.

Some of the above-mentioned functions of the display controller 1 may be achieved by the dedicated hardware, and the other functions may be achieved by software or firmware. As described above, the processing circuit achieves the above-mentioned functions by the hardware, the software, the firmware, or a combination of them.

(Operation of Display Control Device 10)

FIG. 4 is a flowchart showing operation of the display control device 10 in Embodiment 1.

In a step S10, the display controller 1 acquires the first information and the second information from the voice recognition device 30.

In a step S20, the display controller 1 identifies, based on the first information, at least one application related to a speech content.

In a step S30, the display controller 1 identifies a display region to display the at least one application as identified.

In a step S40, the display controller 1 identifies, based on the second information, at least one processing target in processing to be performed by the at least one application as identified. The at least one processing target is related to the speech content.

In a step S50, the display controller 1 causes the at least one processing target identified based on the second information as a recognition candidate to be displayed in the display region to display the at least one application identified based on the first information. The at least one processing target is a processing target in processing to be performed by the at least one application identified based on the first information.

(Effects)

In summary, the display control device 10 in Embodiment 1 is the display control device to perform, on the display device 20 having the display regions in which the plurality of applications each are displayed, display control based on the speech content of the spoken voice. The display control device 10 includes the display controller 1. The display controller 1 acquires the first information allowing identification of the at least one application related to the speech content from among the plurality of applications and the second information allowing identification of the at least one processing target in processing to be performed by the at least one application. The at least one processing target is related to the speech content. The display controller 1 performs control to cause the display device 20 to display, in the display region to display the at least one application identified based on the first information, the at least one processing target identified based on the second information as the recognition candidate. The at least one processing target is a processing target in processing to be performed by the at least one application as the recognition candidate.

With the above-mentioned configuration, the display control device 10 causes the recognition candidate related to the speech content and to cause the application related to the speech content to perform processing to be displayed in the display region (or at a display location or in a window) in which the application is displayed. The location at which the recognition candidate is displayed is directly related to the application, so that there is no need to provide a name and the like of the application to the recognition candidate for display. This allows many recognition candidates to be displayed together within a single display region, to thereby increase the upper limit of the number of character strings to display the recognition candidates. The display control device 10 allows for display of many pieces of information in a display region having a limited space. The display control device 10 also facilitates determination by a user of an application corresponding to the recognition candidate based on the display region in which the recognition candidate is displayed. When the voice recognition device 30 misrecognizes speech, the recognition candidate is displayed in a display region to display an application different from an application intended by the user. That is to say, when the voice recognition device 30 misrecognizes the speech, the display control device 10 facilitates determination by the user of the misrecognition.

The display control method in Embodiment 1 is the display control method of performing, on the display device 20 having the display regions in which the plurality of applications each are displayed, display control based on the speech content of the spoken voice. The display control method includes: acquiring the first information allowing identification of the at least one application related to the speech content from among the plurality of applications and the second information allowing identification of the at least one processing target in processing to be performed by the at least one application, the at least one processing target being related to the speech content; and performing control to cause the display device 20 to display, in the display region to display the at least one application identified based on the first information, the at least one processing target identified based on the second information as the recognition candidate, the at least one processing target being a processing target in processing to be performed by the at least one application.

With the above-mentioned configuration, the display control method causes the recognition candidate related to the speech content and to cause the application related to the speech content to perform processing to be displayed in the display region (at the display location) in which the application is displayed. The location at which the recognition candidate is displayed is directly related to the application, so that there is no need to provide the name and the like of the application to the recognition candidate for display. This allows many recognition candidates to be displayed together within a single display region, to thereby increase the upper limit of the number of character strings to display the recognition candidates. The display control method allows for display of many pieces of information in the display region having the limited space. The display control method also facilitates determination by the user of the application corresponding to the recognition candidate based on the display region in which the recognition candidate is displayed. When the voice recognition device 30 misrecognizes speech, the recognition candidate is displayed in the display region to display the application different from the application intended by the user. That is to say, when the voice recognition device 30 misrecognizes the speech, the display control method facilitates determination by the user of the misrecognition.

Embodiment 2

A display control device and a display control method in Embodiment 2 will be described. Description on configurations and operation similar to those in Embodiment 1 will be omitted.

(Configuration of Display Control Device)

Figure 5:
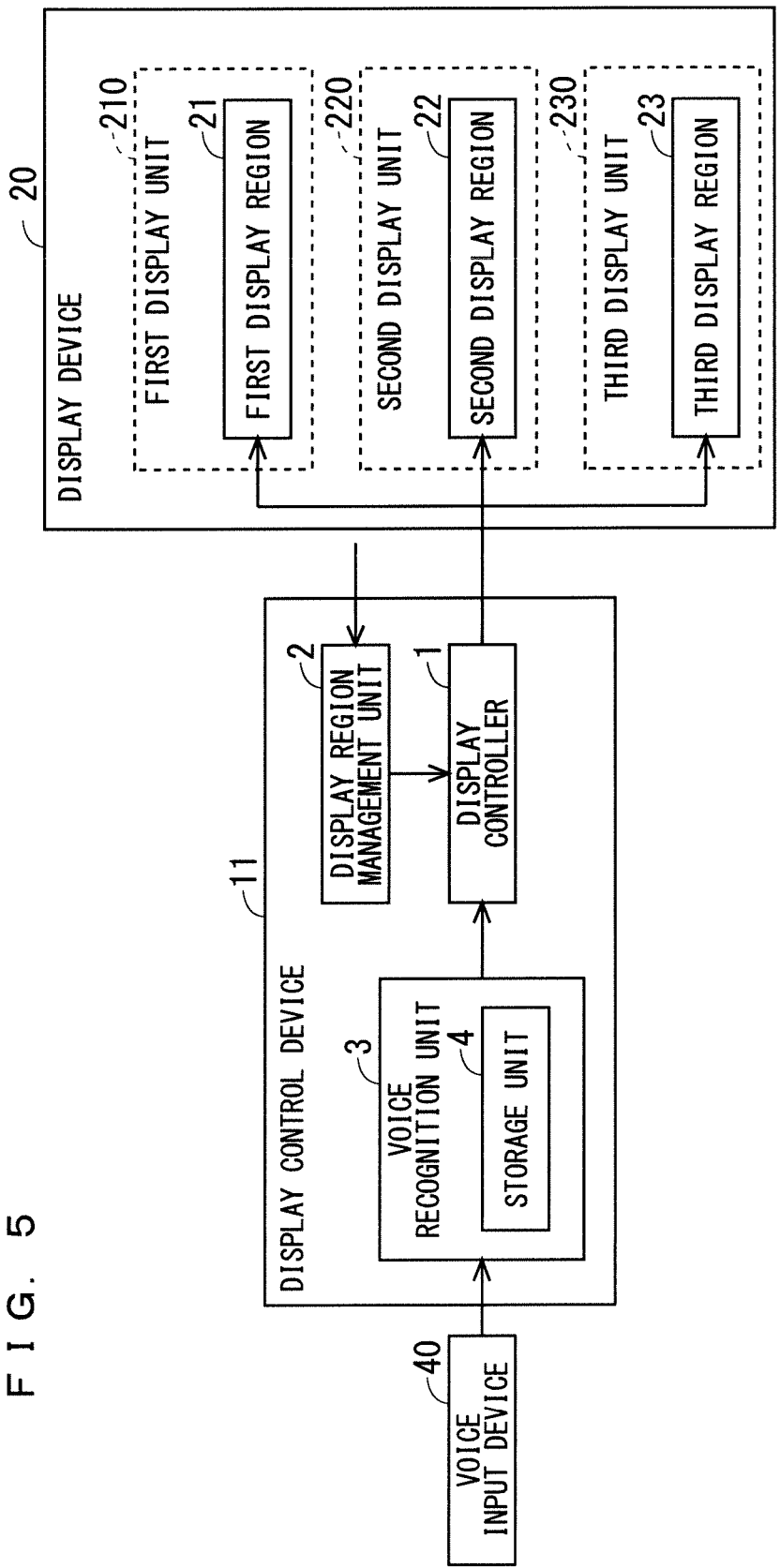
FIG. 5 is a block diagram showing configurations of a display control device and devices operating in relation to the display control device in Embodiment 2.

FIG. 5 is a block diagram showing configurations of a display control device 11 and devices operating in relation to the display control device 11 in Embodiment 2.

A voice input device 40 is a device into which a user inputs a voice.

The display device 20 is a multi-display in Embodiment 2. The display device 20 has three display regions. The display device 20 includes a first display unit 210 having the first display region 21, a second display unit 220 having the second display region 22, and a third display unit 230 having the third display region 23.

The display control device 11 includes a display region management unit 2, a voice recognition unit 3, and the display controller 1.

The display region management unit 2 manages display region information representing a correspondence between applications and the display regions to display the applications. The display region management unit 2 may manage display locations to display the applications. The display region information is stored in advance in the display region management unit 2, for example. The display region management unit 2 notifies the display controller 1 of the display region information. The display region management unit 2 is, for example, an application manager.

The voice recognition unit 3 includes a storage unit 4 to store the database in which the plurality of speech contents prepared in advance, the first information, and the second information are associated. The voice recognition unit 3 has functions similar to those of the voice recognition device 30 shown in Embodiment 1.

The voice recognition unit 3 acquires to recognize the voice of the user input into the voice input device 40. In Embodiment 2, the voice recognition unit 3 recognizes the voice spoken by the user in a state of different applications being displayed in the respective three display regions. The voice recognition unit 3 identifies the first information and the second information related to the speech content with reference to the database, and outputs them to the display controller 1. The voice recognition unit 3 is, for example, a voice recognition engine.

The display controller 1 acquires the first information and the second information output from the voice recognition unit 3. The display controller 1 identifies, based on the first information, at least one application related to the speech content from among the applications. In this case, the display controller 1 identifies the at least one application with reference to a correspondence between the first information and the applications registered in advance. The correspondence is stored in advance in the display controller 1, for example. The display controller 1 identifies, based on the display region information managed by the display region management unit 2, a display region to display the at least one application as identified. The display controller 1 identifies, based on the second information, at least one processing target in processing to be performed by the at least one application as identified. The at least one processing target is related to the speech content. The display controller 1 causes the processing target identified based on the second information to be displayed, in the display region to display the application identified based on the first information, as the recognition candidate. The display controller 1 is, for example, a voice recognition manager.

Figure 6:
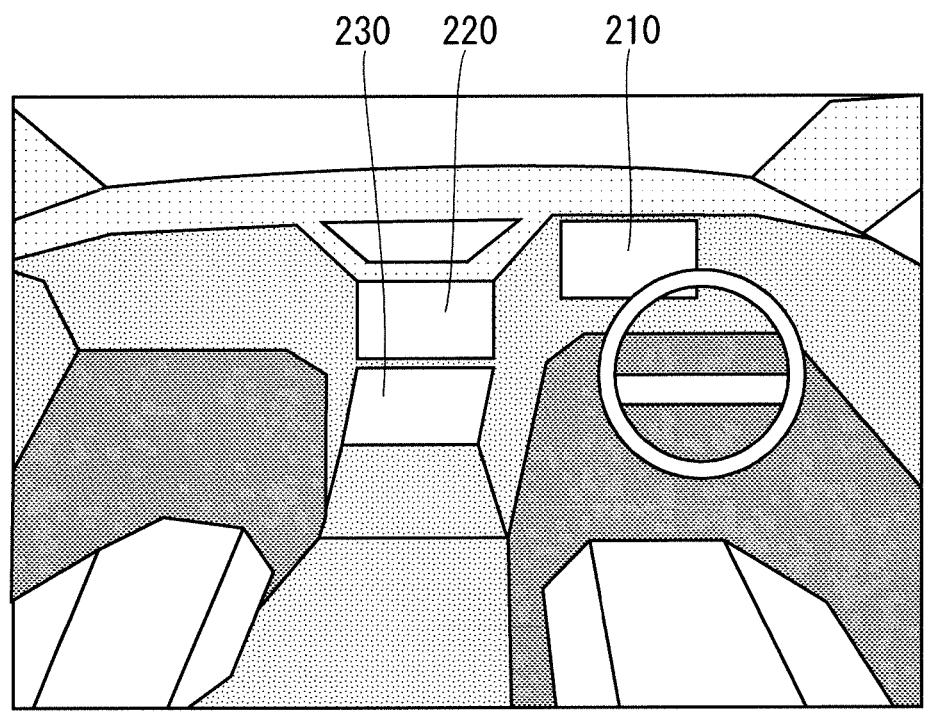
FIG. 6 illustrates a configuration of a multi-display as a display device in Embodiment 2.

FIG. 6 illustrates a configuration of a multi-display provided in a vehicle. The display device 20 as the multi-display is installed in a cockpit of the vehicle. The first display unit 210, the second display unit 220, and the third display unit 230 constituting the multi-display are provided separately in the vehicle. The first display unit 210, the second display unit 220, and the third display unit 230 are placed, for example, in descending order of level of an installation location. Alternatively, the first display unit 210, the second display unit 220, and the third display unit 230 are placed, for example, in descending order of closeness to a driver's seat or a passenger's seat. The display units are placed in an order to facilitate visual recognition by the user.

Figure 7:
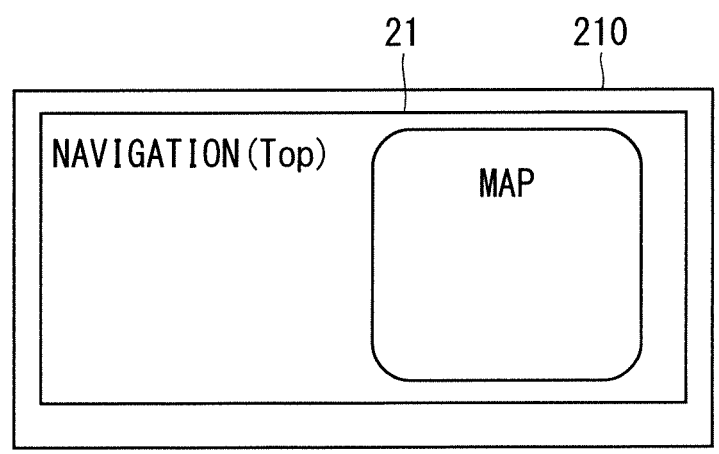
FIG. 7 shows a first display region of a first display unit in Embodiment 2.

FIG. 7 shows the first display region 21 of the first display unit 210. Navigation as an application is displayed in the first display region 21. In FIG. 7, a top screen corresponding to an initial state or a standby state thereof is displayed. The navigation displays a map. The navigation has a function to navigate to a set destination. In Embodiment 2, the navigation has a function to navigate to a home identified based on a name included in a speech content recognized by the voice recognition unit 3.

FIG. 8 shows the second display region 22 of the second display unit 220. A media player as an application is displayed in the second display region 22. In FIG. 8, a top screen thereof is displayed. The media player displays an album tide. The media player has a function to play music. In Embodiment 2, the media player has a function to play a song of an artist identified based on a name included in a speech content recognized by the voice recognition unit 3.

FIG. 9 shows the third display region 23 of the third display unit 230. A phone as an application is displayed in the third display region 23. In FIG. 9, a top screen thereof is displayed. The phone displays a phone book. The phone has a function to make a call. In Embodiment 2, the phone has a function to call a person identified based on a name included in a speech content recognized by the voice recognition unit 3.

FIG. 10 shows the display region information managed by the display region management unit 2. The display region information stores information indicating that the navigation is displayed in the first display region 21, the media player is displayed in the second display region 22, and the phone is displayed in the third display region 23. The display region information includes, for example, a table shown in FIG. 10.

In Embodiment 2, the voice recognition unit 3 recognizes voices of command speech and candidate selection speech. The command speech is speech to designate processing to be performed by each of the applications. The candidate selection speech is speech to designate, from a plurality of recognition candidates, a processing target in the processing to be performed by the application. The voice recognition unit 3 outputs a topic and a slot related to the speech content of the user. The topic includes the first information, and corresponds to a type of the command. The slot includes the second information, and is a parameter associated with the command.

FIG. 11 shows spoken voices recognized by the voice recognition unit 3 in response to the command speech, topics and slots output to the display controller 1. For example, the user says "navigate to John Smith" to the voice input device 40 to cause the navigation to perform processing to navigate to the destination. The voice recognition unit 3 recognizes "navigate to John Smith" as a speech content. The voice recognition unit 3 references the database stored in the storage unit 4, and outputs "NAV.navigateName" as a topic related to "navigate" included in the speech content. The voice recognition unit 3 also outputs "John Smith" as a slot related to "John Smith" included in the speech content. The topic "NAV.navigateName" requires setting, to the destination, a point corresponding to a specific name from among names registered in advance in the navigation, and navigating. That is to say, the navigation as the application identified in relation to the speech content performs processing to set, to the destination, a place stored as John Smith from among the names registered in advance based on the topic "NAV.navigateName" and the slot "John Smith", and to navigate to the destination. In FIG. 11, a topic "MPL.playArtist" requires playing a song of an artist corresponding to a specific name from among names registered in advance in the media player. A topic "PHN.callName" requires calling a phone number corresponding to a specific name from among names registered in advance in the phone. As described above, the voice recognition unit 3 recognizes the requirements of the user as the topic and the slot. That is to say, the topic and the slot are the results of understanding of intention by the voice recognition unit 3. The speech contents shown in FIG. 11 are just examples, and the speech contents are not limited to them. For example, speech contents associated with the topic "NAV.navigateName" include any command speech of the user to order the navigation to navigate. The command speech is stored in the database stored in the storage unit 4. The command speech is learned and accumulated by the voice recognition unit 3.

FIG. 12 shows spoken voices recognized by the voice recognition unit 3 in response to the candidate selection speech, a topic and slots output to the display controller 1. Assume that, when the navigation performs processing to navigate to the destination, a plurality of destinations as processing targets in the processing to navigate are displayed, in the display region, as recognition candidates, for example. The user says "select number one" to the voice input device 40 to designate the destination to the navigation. When having recognized "select number one" as a speech content, for example, the voice recognition unit 3 references the database stored in the storage unit 4, and outputs "CMD.selectNbest" as a topic related to "select". The voice recognition unit 3 also outputs "number one" as a slot related to "number one". This is processing to select a recognition candidate corresponding to identification (ID) =1.

FIG. 13 shows a correspondence between the topics each including the first information and the applications. The topics corresponding to the respective three applications are herein stored in a table.

(Operation of Display Control Device: Display Control Operation for Navigation)

Figure 14:
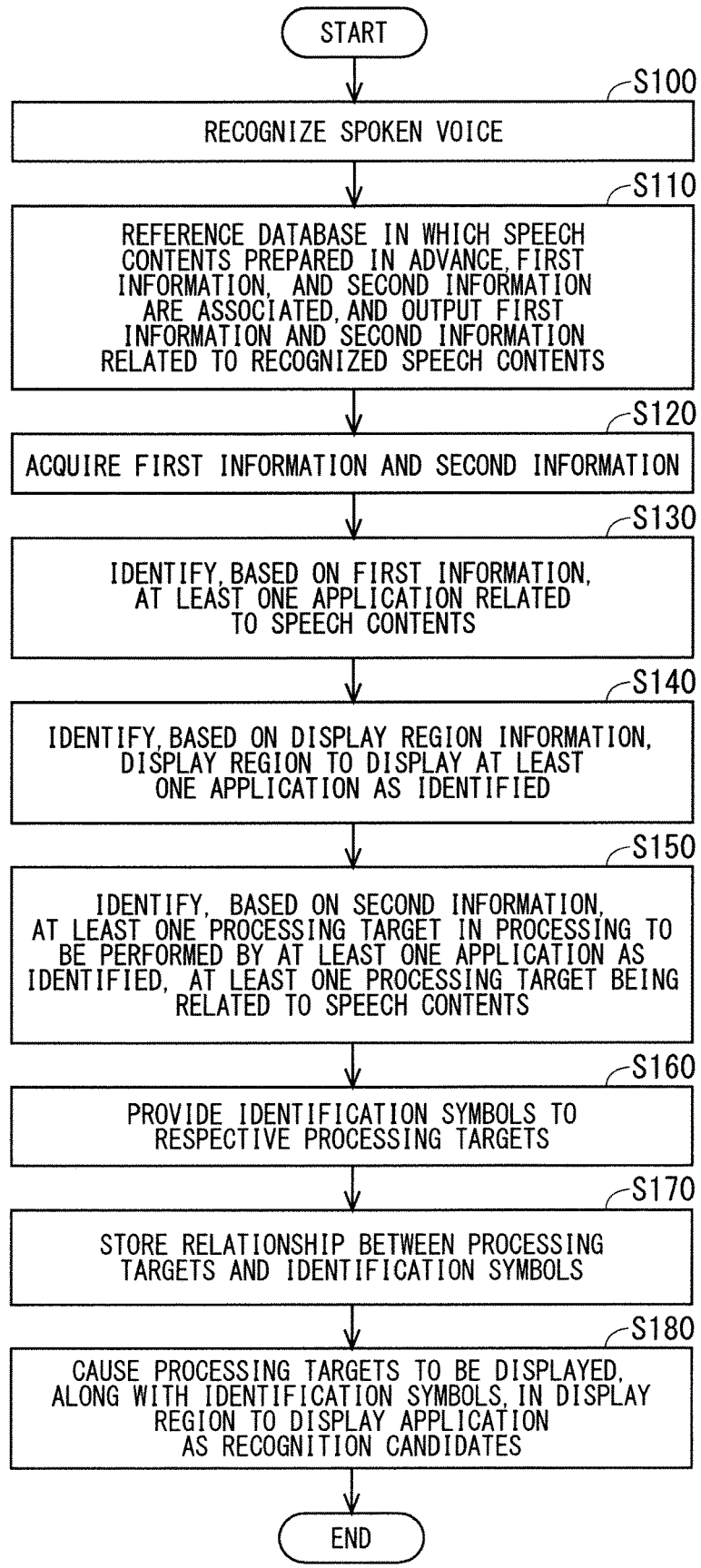
FIG. 14 is a flowchart showing operation of the display control device in response to the command speech in Embodiment 2.
Figure 15:
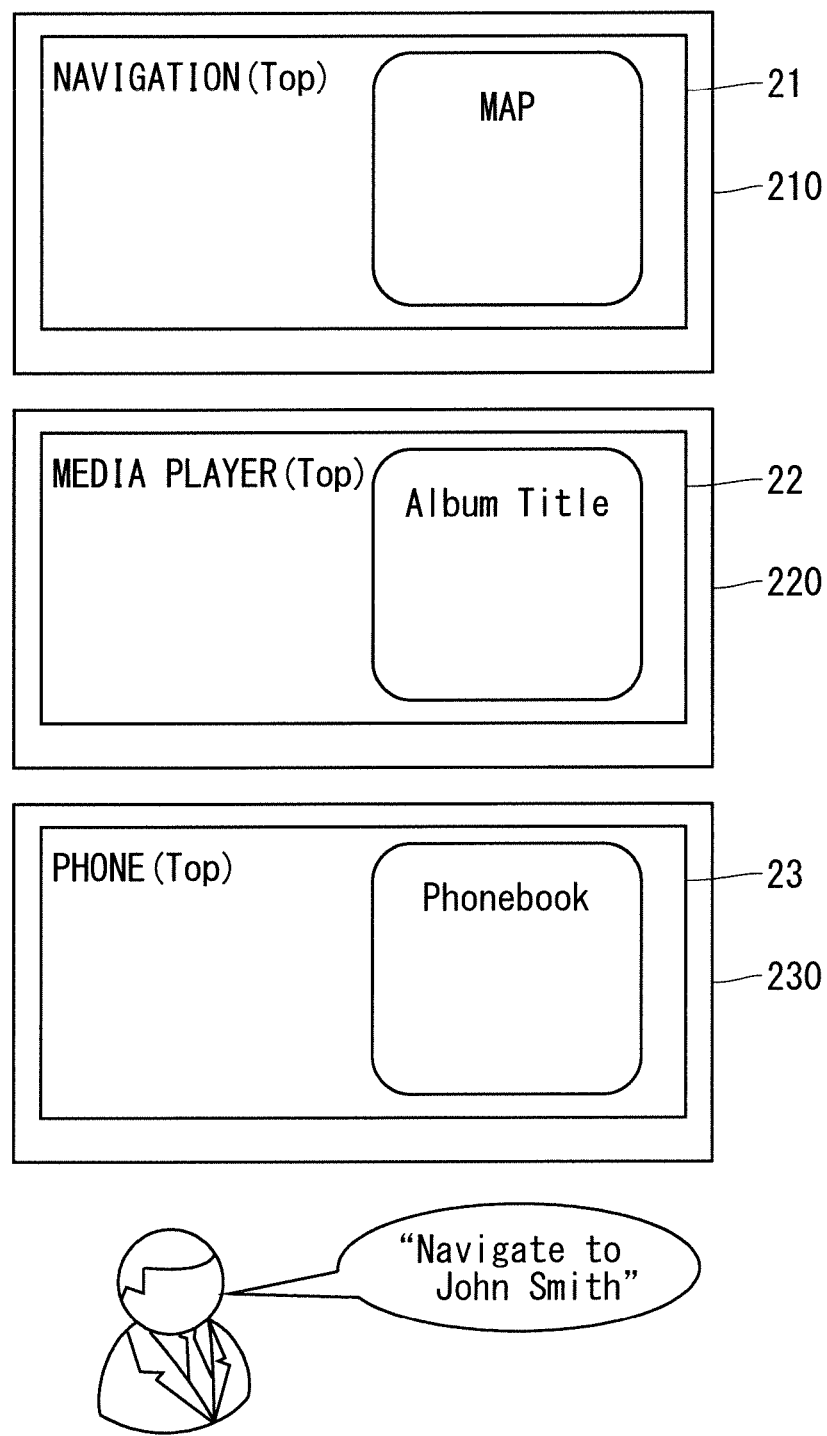
FIG. 15 shows a state of top screens of the applications being displayed in the respective display regions in Embodiment 2.

FIG. 14 is a flowchart showing operation of the display control device 11 in response to the command speech in Embodiment 2. Display control operation for the navigation from among the three applications will be described first. When a command including a registered name of a person is recognized through voice recognition, the navigation can set a home of the person to the destination. Names of persons registered in the navigation are herein John Smith and Josh Smith. FIG. 15 shows a state of the top screens of the applications being displayed in the respective display regions.

In a step S100, the voice recognition unit 3 recognizes a spoken voice. That is to say, the user inputs the command speech for the navigation into the voice input device 40, and the voice recognition unit 3 recognizes a voice thereof. The user herein says "navigate to John Smith". "John Smith" and "Josh Smith" are similar in pronunciation. The voice recognition unit 3 thus recognizes "navigate to John Smith" and "navigate to Josh Smith" as speech contents. Hereinafter, "navigate to John Smith" is referred to as the first speech content, and "navigate to Josh Smith" is referred to as the second speech content.

In a step S110, the voice recognition unit 3 references the database in which the speech contents prepared in advance, the first information, and the second information are associated, and outputs the first information and the second information related to the recognized speech contents. As shown in FIG. 11, "navigate to John Smith", "navigate to Josh Smith", "John Smith", and "Josh Smith" are stored, as the speech contents prepared in advance, in the database corresponding to the navigation. The voice recognition unit 3 references the database, and outputs "NAV.navigateName" as a topic and further outputs "John Smith" as a slot associated with "navigate to John Smith" as the first speech content. The voice recognition unit 3 similarly outputs the topic "NAV.navigateName" and a slot "Josh Smith" associated with "navigate to Josh Smith" as the second speech content.

In a step S120, the display controller 1 acquires the first information and the second information output from the voice recognition unit 3. The display controller 1 herein acquires the topic and the slots.

In a step S130, the display controller 1 identifies, based on the first information, at least one application related to the speech contents. In each of the first speech content and the second speech content, the topic including the first information is "NAV.navigateName". The display controller 1 identifies, based on the correspondence shown in FIG. 13, the navigation as an application related to the speech contents.

In a step S140, the display controller 1 identifies, based on the display region information, the display region to display the at least one application as identified. The display controller 1 identifies, based on the display region information shown in FIG. 10, the first display region 21 in which the navigation is displayed from among the three display regions.

In a step S150, the display controller 1 identifies, based on the second information, at least one processing target in processing to be performed by the at least one application as identified. The at least one processing target is related to the speech contents. The processing to be performed by the navigation as the identified application and related to the speech contents is herein processing corresponding to the topic "NAV.navigateName". "NAV.navigateName" means processing to set, to the destination, the point corresponding to the specific name from among the names registered in advance, and to navigate to the destination. That is to say, the processing target in processing to be performed by the navigation is the destination. The slot associated with the first speech content is "John Smith", and the slot associated with the second speech content is "Josh Smith". The display controller 1 identifies, based on the slots, a point corresponding to "John Smith" and a point corresponding to "Josh Smith" as processing targets, that is, destinations.

In a step S160, the display controller 1 provides identification symbols to the respective processing targets. FIG. 16 shows a relationship between the processing targets and the identification symbols. The display controller 1 provides, as the identification symbol, an ID number "1" to "John Smith". The display controller 1 provides an ID number "2" to "Josh Smith".

In a step S170, the display controller 1 stores the relationship between the processing targets and the identification symbols. The display controller 1 stores, for example, a table in which the processing targets and the identification symbols are stored as shown in FIG. 16.

Figure 17:
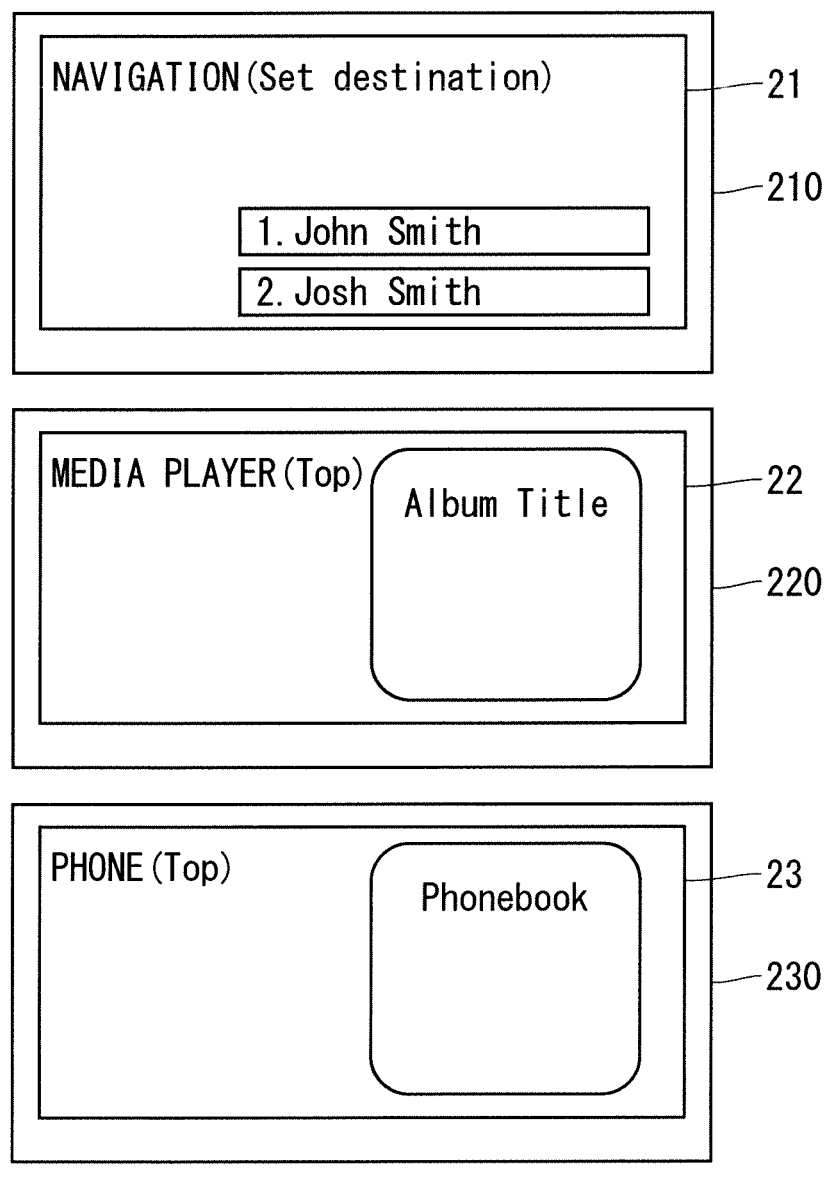
FIG. 17 shows a state of recognition candidates being displayed in the first display region in Embodiment 2.

In a step S180, the display controller 1 causes the processing targets to be displayed, along with the identification symbols, in the display region to display the application as the recognition candidates. FIG. 17 shows a state of the recognition candidates being displayed in the first display region 21. The display controller 1 causes the slots "John Smith" and "Josh Smith" to be displayed, along with the ID numbers, in the first display region 21 as the recognition candidates. "1. John Smith" and "2. Josh Smith" are displayed in the first display region 21. In this case, the navigation displays a screen to set the destination. The media player and the phone not corresponding to the topic related to the speech contents do not display the recognition candidates.

Figure 18:
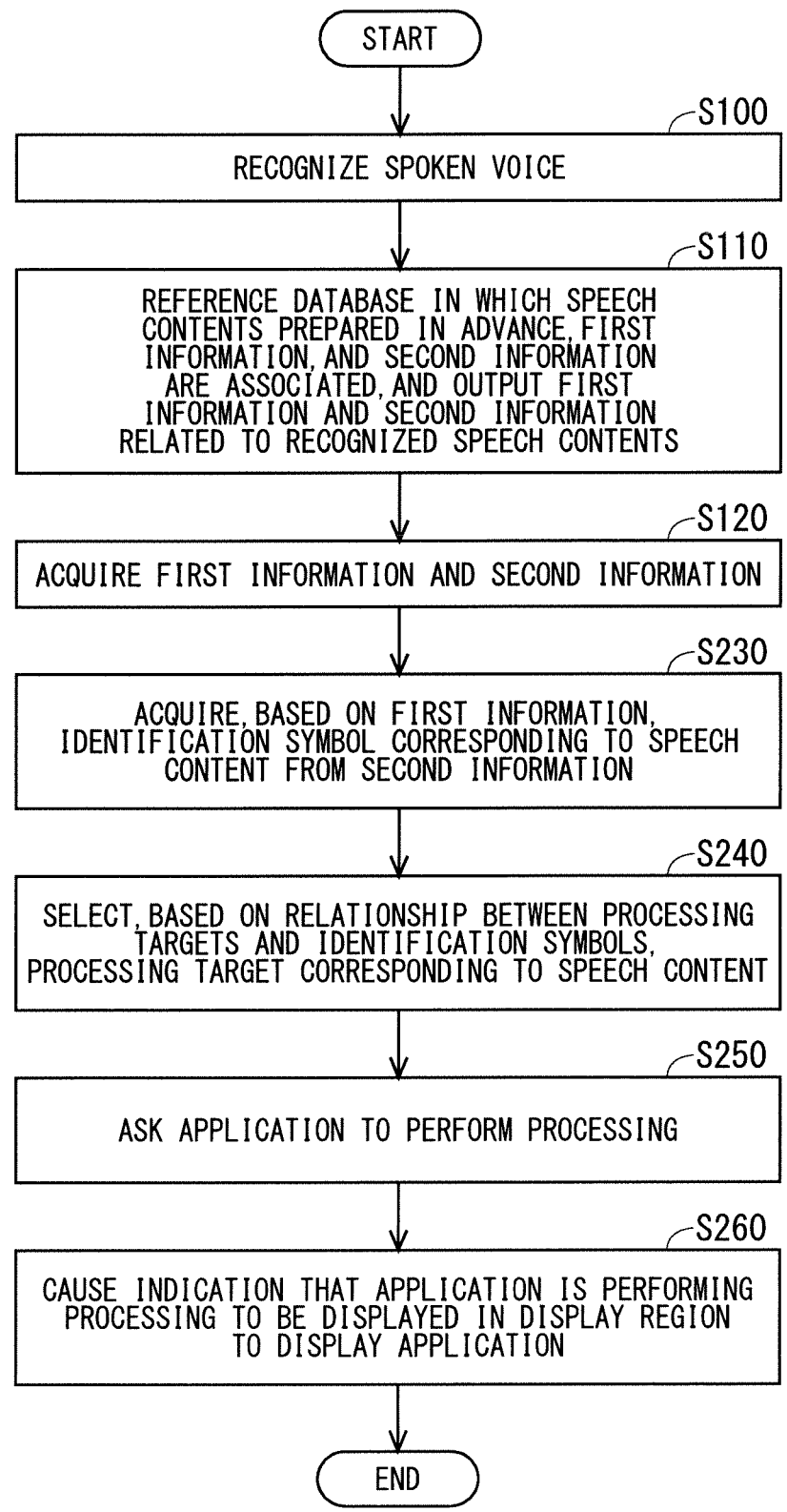
FIG. 18 is a flowchart showing operation of the display control device in response to the candidate selection speech in Embodiment 2.

FIG. 18 is a flowchart showing operation of the display control device 11 in response to the candidate selection speech in Embodiment 2.

In the step S100, the voice recognition unit 3 recognizes a spoken voice. That is to say, the user inputs the candidate selection speech for the navigation into the voice input device 40, and the voice recognition unit 3 recognizes a voice thereof. The user herein says "select number one" based on the recognition candidates shown in FIG. 17. The voice recognition unit 3 recognizes "select number one" in response to the speech.

In the step S110, the voice recognition unit 3 references the database in which the speech contents prepared in advance, the first information, and the second information are associated, and outputs the first information and the second information related to the recognized speech content. As shown in FIG. 12, "number one" and "select number one" are stored, as the speech contents prepared in advance, in the database corresponding to the candidate selection speech. The voice recognition unit 3 references the database, and outputs the topic "CMD.selectNbest" and the slot "number one" associated with "select number one" as the speech content.

In the step S120, the display controller 1 acquires the first information and the second information output from the voice recognition unit 3. The display controller 1 herein acquires the topic and the slot.

In a step S230, the display controller 1 acquires, based on the first information, an identification symbol corresponding to the speech content from the second information. The display controller 1 acquires, based on the topic "CMD.selectNbest", an ID number corresponding to the slot "number one". In this case, "1" is acquired as the ID number.

In a step S240, the display controller 1 selects, based on the relationship between the processing targets and the identification symbols, a processing target corresponding to the speech content. The display controller 1 selects the slot "John Smith" corresponding to the spoken identification symbol based on the relationship between the processing targets and the identification symbols shown in FIG. 16. From the foregoing, the processing target in processing to be performed by the application is determined. That is to say, the destination set by the navigation is determined to be the point corresponding to "John Smith".

In a step S250, the display controller 1 asks the application to perform processing. The display controller 1 asks the navigation to navigate to the point corresponding to "John Smith".

In a step S260, the display controller 1 causes an indication that the application is performing processing to be displayed in the display region to display the application. FIG. 19 shows a state of a screen during performance of processing being displayed in the first display region 21. In the first display region 21 to display the navigation, the display controller 1 causes a path to "John Smith's home" as the point corresponding to "John Smith" and the like to be displayed on the map. The display controller 1 causes the top screen to be displayed in the first display region 21. In the above-mentioned operation, the top screen in the second display region 22 to display the media player and the top screen in the third display region 23 to display the phone remain unchanged.

(Operation of Display Control Device: Display Control Operation for Media Player)

Figure 20:
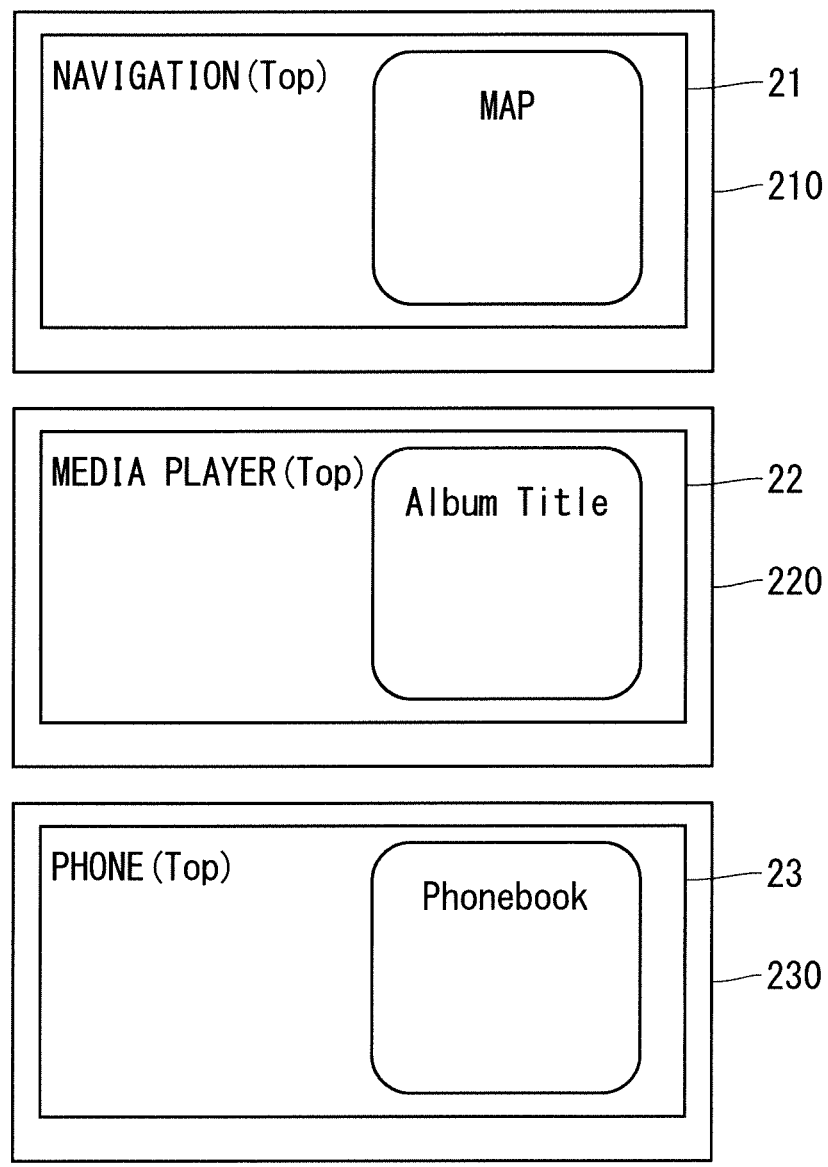
FIG. 20 shows the state of the top screens of the applications being displayed in the respective display regions in Embodiment 2.

Display control operation for the media player from among the three applications will be described next in accordance with the flowchart showing operation in response to the command speech shown in FIG. 14. When a command including a registered name is recognized through voice recognition, the media player can select and play a song of an artist having the name. Names of persons registered in the media player are herein Joan Smith and Josh Smith. FIG. 20 shows the state of the top screens of the applications being displayed in the respective display regions.

In the step S100, the voice recognition unit 3 recognizes a spoken voice. The user herein says "play Joan Smith". "Joan Smith" and "Josh Smith" are similar in pronunciation. The voice recognition unit 3 thus recognizes "play Joan Smith" and "play Josh Smith" as speech contents. Hereinafter, "play Joan Smith" is referred to as the third speech content, and "play Josh Smith" is referred to as the fourth speech content.

In the step S110, the voice recognition unit 3 references the database in which the speech contents prepared in advance, the first information, and the second information are associated, and outputs the first information and the second information related to the recognized speech contents. As shown in FIG. 11, "play Joan Smith", "play Josh Smith", "Joan Smith", and "Josh Smith" are stored, as the speech contents prepared in advance, in the database corresponding to the media player. The voice recognition unit 3 references the database, and outputs "MPL.playArtist" as a topic and "Joan Smith" as a slot associated with "play Joan Smith" as the third speech content. The voice recognition unit 3 similarly outputs "MPL.playArtist" as a topic and "Josh Smith" as a slot associated with "play Josh Smith" as the fourth speech content.

In the step S120, the display controller 1 acquires the first information and the second information output from the voice recognition unit 3. The display controller 1 herein acquires the topic and the slots.

In the step S130, the display controller 1 identifies, based on the first information, at least one application related to the speech contents. In each of the third speech content and the fourth speech content, the topic including the first information is "MPL.playArtist". The display controller 1 identifies, based on the correspondence shown in FIG. 13, the media player as an application related to the speech contents.

In the step S140, the display controller 1 identifies, based on the display region information, the display region to display the at least one application as identified. The display controller 1 identifies, based on the display region information shown in FIG. 10, the second display region 22 in which the media player is displayed from among the three display regions.

In the step S150, the display controller 1 identifies, based on the second information, at least one processing target in processing to be performed by the at least one application as identified. The at least one processing target is related to the speech contents. The processing to be performed by the media player as the identified application and related to the speech contents is herein processing corresponding to the topic "MPL.playArtist". "MPL.playArtist" means processing to play a song of an artist corresponding to the specific name from among the names registered in advance. That is to say, the processing target in processing to be performed by the media player is the song of the artist. The slot associated with the third speech content is "Joan Smith", and the slot associated with the fourth speech content is "Josh Smith". The display controller 1 identifies, based on the slots, a song corresponding to "Joan Smith" and a song corresponding to "Josh Smith" as processing targets, that is, songs of artists.

In the step S160, the display controller 1 provides identification symbols to the respective processing targets. FIG. 21 shows a relationship between the processing targets and the identification symbols. The display controller 1 provides, as the identification symbol, the ID number "1" to "Joan Smith". The display controller 1 provides the ID number "2" to "Josh Smith".

In the step S170, the display controller 1 stores the relationship between the processing targets and the identification symbols. The display controller 1 stores, for example, a table in which the processing targets and the identification symbols are stored as shown in FIG. 21.

Figure 22:
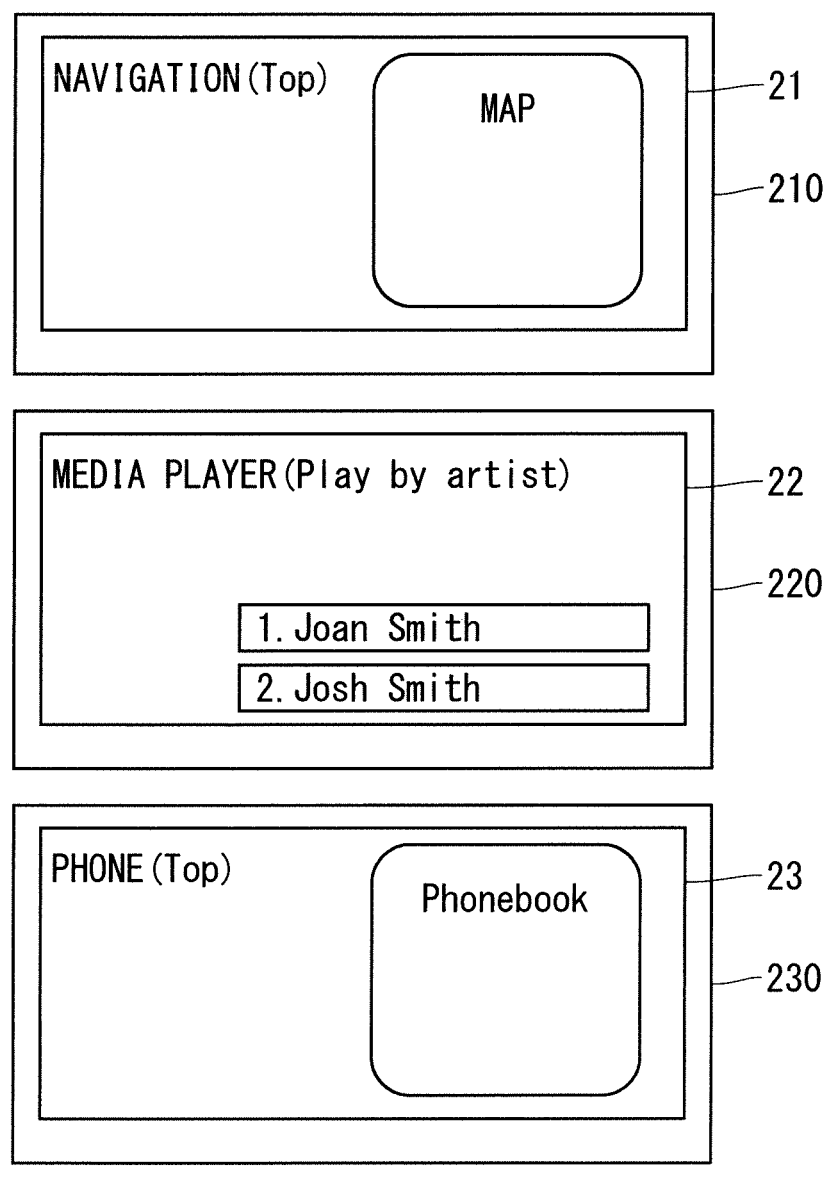
FIG. 22 shows a state of recognition candidates being displayed in the second display region in Embodiment 2.

In the step S180, the display controller 1 causes the processing targets to be displayed, along with the identification symbols, in the display region to display the application as the recognition candidates. FIG. 22 shows a state of the recognition candidates being displayed in the second display region 22. The display controller 1 causes the slots "Joan Smith" and "Josh Smith" to be displayed, along with the ID numbers, in the second display region 22 as the recognition candidates. "1. Joan Smith" and "2. Josh Smith" are displayed in the second display region 22. In this case, the media player displays a screen to play music by artist. The navigation and the phone not corresponding to the topic related to the speech contents do not display the recognition candidates.

Operation of the display control device 11 in response to the candidate selection speech will be described next in accordance with the flowchart shown in FIG. 18.

In the step S100, the voice recognition unit 3 recognizes a spoken voice. That is to say, the user inputs the candidate selection speech for the media player into the voice input device 40, and the voice recognition unit 3 recognizes a voice thereof. The user herein says "select number one" based on the recognition candidates shown in FIG. 22. The voice recognition unit 3 recognizes "select number one" in response to the speech.

In the step S110, the voice recognition unit 3 references the database in which the speech contents prepared in advance, the first information, and the second information are associated, and outputs the first information and the second information related to the recognized speech content. The voice recognition unit 3 references the database corresponding to the candidate selection speech shown in FIG. 12, and outputs the topic "CMD.selectNbest" and the slot "number one" associated with "select number one" as the speech content.

In the step S120, the display controller 1 acquires the first information and the second information output from the voice recognition unit 3. The display controller 1 herein acquires the topic and the slot.

In the step S230, the display controller 1 acquires, based on the first information, an identification symbol corresponding to the speech content from the second information. The display controller 1 acquires, based on the topic "CMD.selectNbest", an ID number corresponding to the slot "number one". In this case, "1" is acquired as the ID number.

In the step S240, the display controller 1 selects, based on the relationship between the processing targets and the identification symbols, a processing target corresponding to the speech content. The display controller 1 selects the slot "Joan Smith" corresponding to the spoken identification symbol based on the relationship between the processing targets and the identification symbols shown in FIG. 21. From the foregoing, the processing target in processing to be performed by the application is determined. That is to say, the song of the artist played by the media player is determined to be the song corresponding to "Joan Smith".

In the step S250, the display controller 1 asks the application to perform processing. The display controller 1 asks the media player to play the song corresponding to "Joan Smith".

Figure 23:
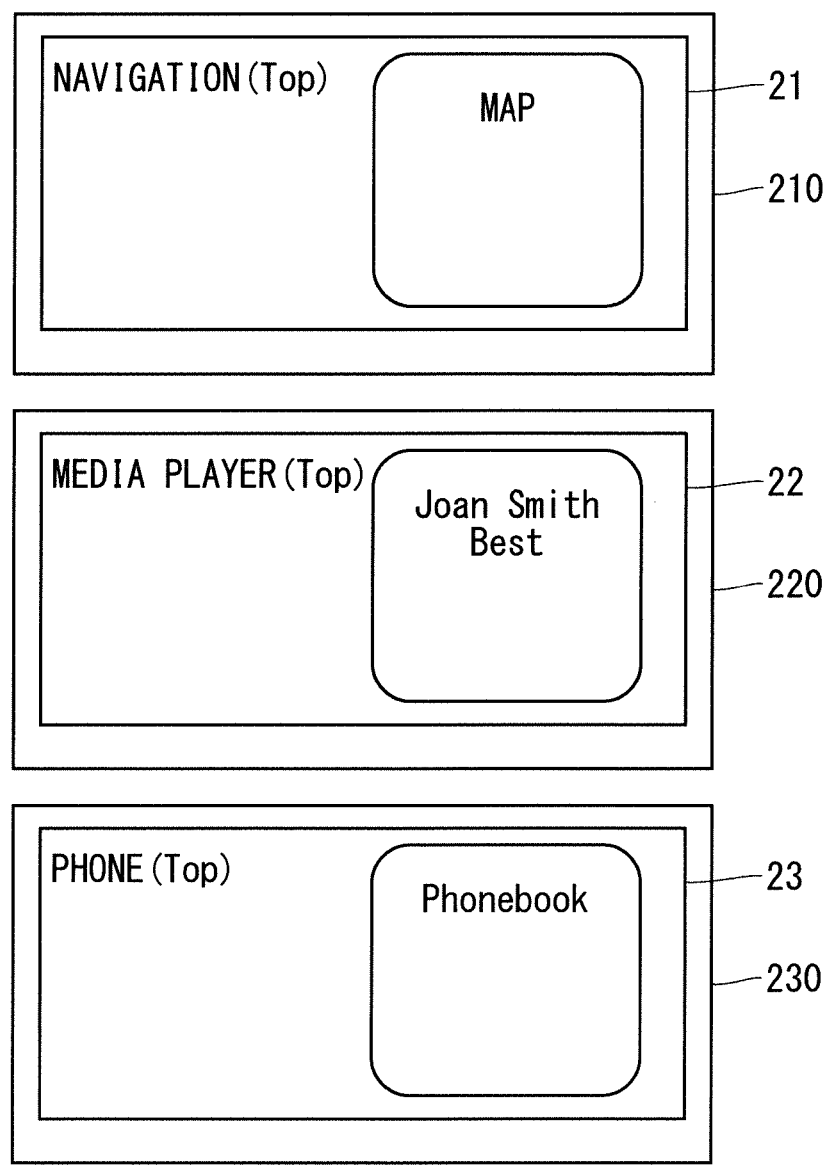
FIG. 23 shows a state of a screen during performance of processing being displayed in the second display region in Embodiment 2.

In the step S260, the display controller 1 causes the indication that the application is performing processing to be displayed in the display region to display the application. FIG. 23 shows a state of a screen during performance of processing being displayed in the second display region 22. In the second display region 22 to display the media player, the display controller 1 causes information "Joan Smith Best" as an album title corresponding to "Joan Smith" and the like to be displayed. The media player plays music. The display controller 1 causes the top screen to be displayed in the second display region 22. The top screen in the first display region 21 to display the navigation and the top screen in the third display region 23 to display the phone remain unchanged.

(Operation of Display Control Device: Display Control Operation for Phone)

Figure 24:
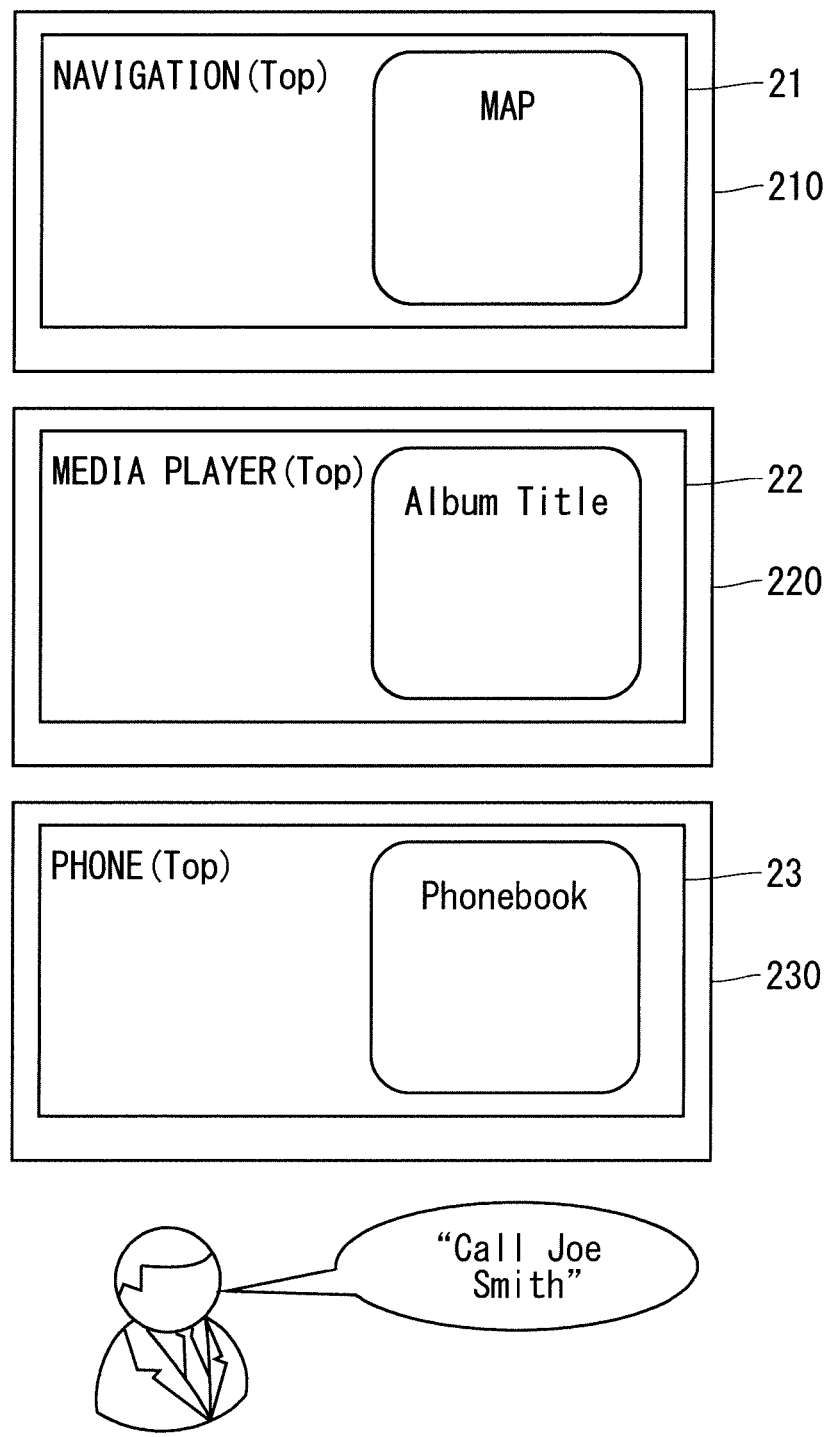
FIG. 24 shows the state of the top screens of the applications being displayed in the respective display regions in Embodiment 2.

Display control operation for the phone from among the three applications will be described next in accordance with the flowchart showing operation in response to the command speech shown in FIG. 14. When a command including a registered name is recognized through voice recognition, the phone can call a person corresponding to the name, that is, a contact name. Names of persons registered in the phone are herein Joe Smith and Josh Smith. FIG. 24 shows the state of the top screens of the applications being displayed in the respective display regions.

In the step S100, the voice recognition unit 3 recognizes a spoken voice. The user herein says "call Joe Smith". "Joe Smith" and "Josh Smith" are similar in pronunciation. The voice recognition unit 3 thus recognizes "call Joe Smith" and "call Josh Smith" as speech contents. Hereinafter, "call Joe Smith" is referred to as the fifth speech content, and "call Josh Smith" is referred to as the sixth speech content.

In the step S110, the voice recognition unit 3 references the database in which the speech contents prepared in advance, the first information, and the second information are associated, and outputs the first information and the second information related to the recognized speech contents. As shown in FIG. 11, "call Joe Smith", "call Josh Smith", "Joe Smith", and "Josh Smith" are stored, as the speech contents prepared in advance, in the database corresponding to the phone. The voice recognition unit 3 references the database, and outputs "PHN.callName" as a topic and "Joe Smith" as a slot associated with "call Joe Smith" as the fifth speech content. The voice recognition unit 3 similarly outputs "PHN.callName" as a topic and "Josh Smith" as a slot associated with "call Josh Smith" as the sixth speech content.

In the step S120, the display controller 1 acquires the first information and the second information output from the voice recognition unit 3. The display controller 1 herein acquires the topic and the slots.

In the step S130, the display controller 1 identifies, based on the first information, at least one application related to the speech contents. In each of the fifth speech content and the sixth speech content, the topic including the first information is "PHN.callName". The display controller 1 identifies, based on the correspondence shown in FIG. 13, the phone as an application related to the speech contents.

In the step S140, the display controller 1 identifies, based on the display region information, the display region to display the at least one application as identified. The display controller 1 identifies, based on the display region information shown in FIG. 10, the third display region 23 in which the phone is displayed from among the three display regions.

In the step S150, the display controller 1 identifies, based on the second information, at least one processing target in processing to be performed by the at least one application as identified. The at least one processing target is related to the speech contents. The processing to be performed by the phone as the identified application and related to the speech contents is herein processing corresponding to the topic "PHN.callName". "PHN.callName" means processing to call a phone number corresponding to the specific name from among the names registered in advance. That is to say, the processing target in processing to be performed by the phone is the name of the person to be called. The slot associated with the fifth speech content is "Joe Smith", and the slot associated with the sixth speech content is "Josh Smith". The display controller 1 identifies, based on the slots, a phone number corresponding to "Joe Smith" and a phone number corresponding to "Josh Smith" as targets to be called.

In the step S160, the display controller 1 provides identification symbols to the respective processing targets. FIG. 25 shows a relationship between the processing targets and the identification symbols. The display controller 1 provides, as the identification symbol, the ID number "1" to "Joe Smith". The display controller 1 provides the ID number "2" to "Josh Smith".

In the step S170, the display controller 1 stores the relationship between the processing targets and the identification symbols. The display controller 1 stores, for example, a table in which the processing targets and the identification symbols are stored as shown in FIG. 25.

Figure 26:
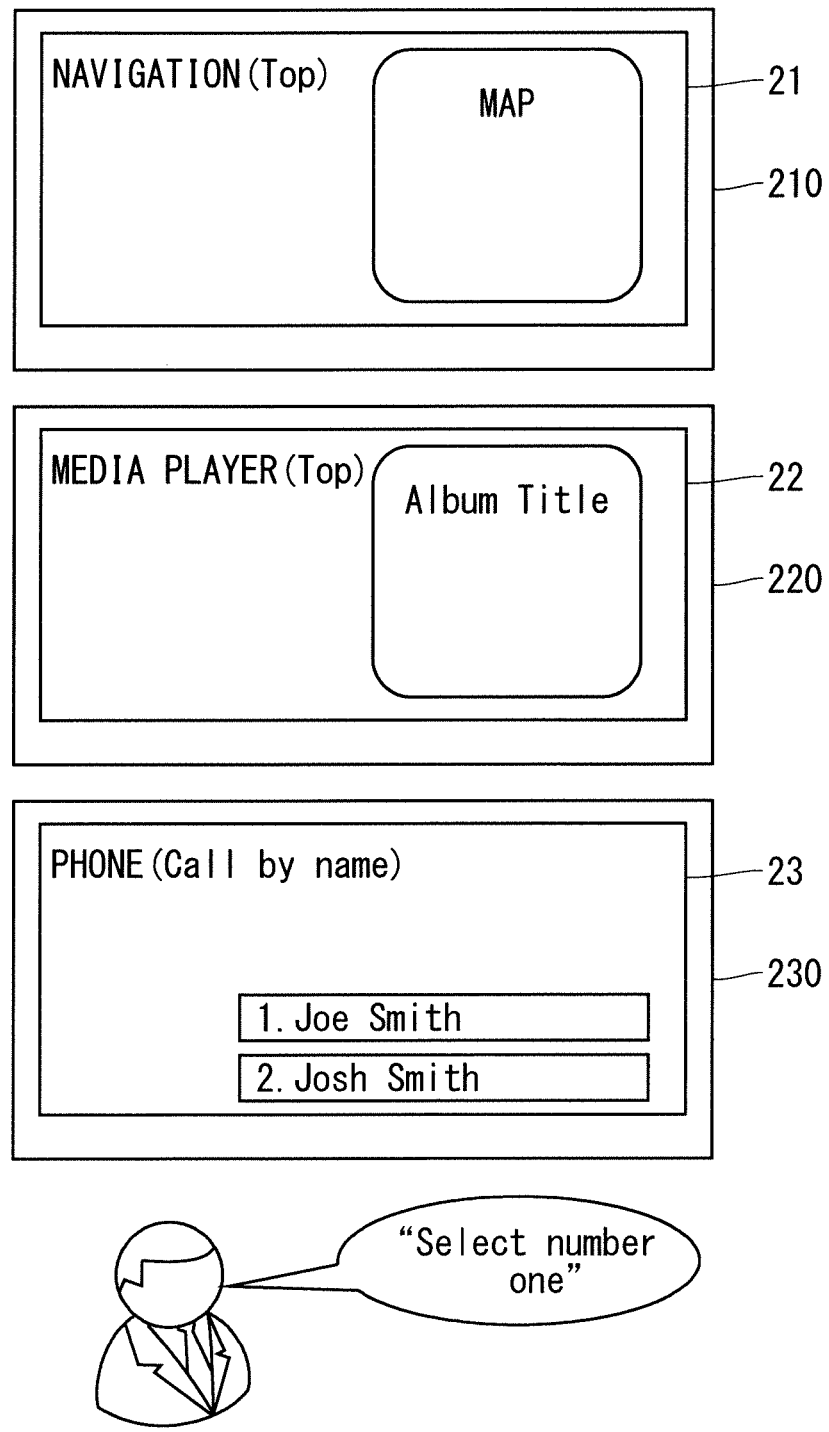
FIG. 26 shows a state of recognition candidates being displayed in the third display region in Embodiment 2.

In the step S180, the display controller 1 causes the processing targets to be displayed, along with the identification symbols, in the display region to display the application as the recognition candidates. FIG. 26 shows a state of the recognition candidates being displayed in the third display region 23. The display controller 1 causes the slots "Joe Smith" and "Josh Smith" to be displayed, along with the ID numbers, in the third display region 23 in which the phone is displayed as the recognition candidates. "1. Joe Smith" and "2. Josh Smith" are displayed in the third display region 23. In this case, the phone displays a screen to call by name. The navigation and the media player not corresponding to the topic related to the speech contents do not display the recognition candidates.

Operation of the display control device 11 in response to the candidate selection speech will be described next in accordance with the flowchart shown in FIG. 18.

In the step S100, the voice recognition unit 3 recognizes a spoken voice. That is to say, the user inputs the candidate selection speech for the phone into the voice input device 40, and the voice recognition unit 3 recognizes a voice thereof. The user herein says "select number one" based on the recognition candidates shown in FIG. 26. The voice recognition unit 3 recognizes "select number one" in response to the speech.

In the step S110, the voice recognition unit 3 references the database in which the speech contents prepared in advance, the first information, and the second information are associated, and outputs the first information and the second information related to the recognized speech content. The voice recognition unit 3 references the database corresponding to the candidate selection speech shown in FIG. 12, and outputs the topic "CMD.selectNbest" and the slot "number one" associated with "select number one" as the speech content.

In the step S120, the display controller 1 acquires the first information and the second information output from the voice recognition unit 3. The display controller 1 herein acquires the topic and the slot.

In the step S230, the display controller 1 acquires, based on the first information, an identification symbol corresponding to the speech content from the second information. The display controller 1 acquires, based on the topic "CMD- .selectNbest", an ID number corresponding to the slot "number one". In this case, "1" is acquired as the ID number.

In the step S240, the display controller 1 selects, based on the relationship between the processing targets and the identification symbols, a processing target corresponding to the speech content. The display controller 1 selects the slot "Joe Smith" corresponding to the spoken identification symbol based on the relationship between the processing targets and the identification symbols shown in FIG. 25. From the foregoing, the processing target in processing to be performed by the application is determined. That is to say, the phone number to be called by the phone is determined to be the phone number corresponding to "Joe Smith".

In the step S250, the display controller 1 asks the application to perform processing. The display controller 1 asks the phone to call the phone number corresponding to "Joe Smith".

Figure 27:
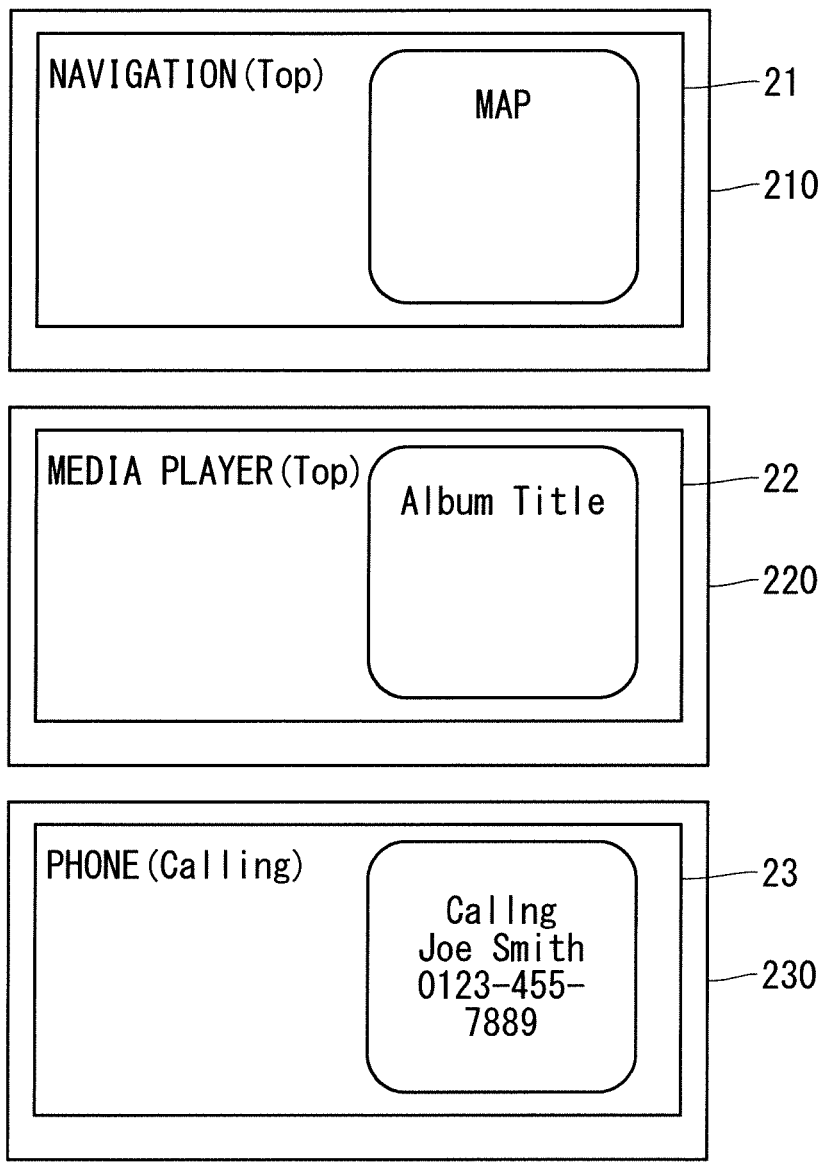
FIG. 27 shows a state of a screen during performance of processing being displayed in the third display region in Embodiment 2.
Figure 28:
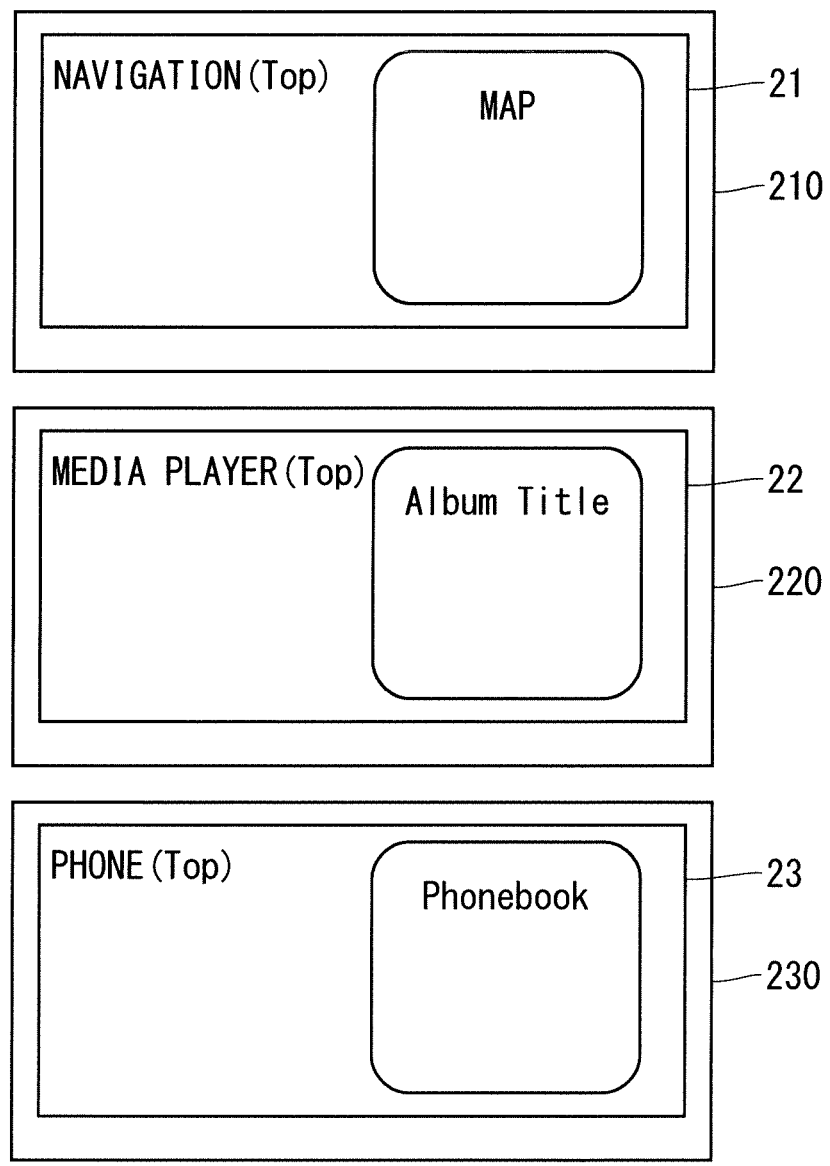
FIG. 28 shows a state of a top screen being displayed in the third display region after the end of calling in Embodiment 2.

In the step S260, the display controller 1 causes the indication that the application is performing processing to be displayed in the display region to display the application. FIG. 27 shows a state of a screen during performance of processing being displayed in the third display region 23. In the third display region 23 to display the phone, the display controller 1 causes information such as "Calling Joe Smith 0123-455-7889" as information including the phone number corresponding to "Joe Smith" to be displayed. In this case, the display controller 1 causes a screen during calling to be displayed. When calling by the phone ends, the display control device 11 causes the top screen to be displayed in the third display region 23. FIG. 28 shows a state of the top screen being displayed in the third display region 23 after the end of calling. In the above-mentioned operation, the top screen in the first display region 21 to display the navigation and the top screen in the second display region 22 to display the media player remain unchanged.

The above-mentioned number of display regions constituting the multi-display is one example, and the number of display regions is not limited to three. The above-mentioned three applications displayed in the respective display regions are just examples, and the applications are not limited to them. The identification symbols are not limited to the ID numbers, and may be characters, signs, symbols, a combination of them, and the like as long as each of the processing targets can be identified.

(Effects)

The location at which the recognition candidates are displayed is directly related to the application, so that there is no need to provide the name, such as the navigation, the media player, and the phone, and the like of the application to the recognition candidates for display. This allows many recognition candidates to be displayed together within a single display region, to thereby increase the upper limit of the number of character strings to display the recognition candidates. The display control device 11 allows for display of many pieces of information in the display region having the limited space.

In summary, the display control device 11 in Embodiment 2 further includes the voice recognition unit 3 to recognize a spoken voice, reference a database in which a speech content acquired by recognizing the voice, the first information, and the second information are associated, and output the first information and the second information related to the speech content to the display controller 1. The voice recognition unit 3 includes the storage unit 4 to store the database.

With the above-mentioned configuration, the display control device 11 can efficiently identify the application and the processing target related to the speech content.

The display control device 11 in Embodiment 2 further includes the display region management unit 2 to manage the display region information representing the correspondence between the applications and the display regions to display the respective applications. The display controller 1 identifies, based on the display region information acquired by the display region management unit 2, the display region to display the at least one application identified based on the first information.

With the above-mentioned configuration, when the display region to display the application can be changed, the display control device 11 can perform control to cause the display device 20 to precisely display the processing target at a display location of the application related to the speech content.

Embodiment 3

The display control device 11 and a display control method in Embodiment 3 will be described. Description on configurations and operation similar to those in Embodiment 1 or 2 will be omitted.

In Embodiment 3, the at least one processing target identified based on the second information includes a plurality of processing targets. The display controller 1 provides identification symbols not overlapping one another to the respective processing targets, and causes each of the processing targets to be displayed, along with each of the identification symbols, in the display region as a recognition candidate. The display controller 1 provides the identification symbols to the respective processing targets in accordance with a degree of priority determined in advance for each of the display regions to display the recognition candidate.

Figure 29:
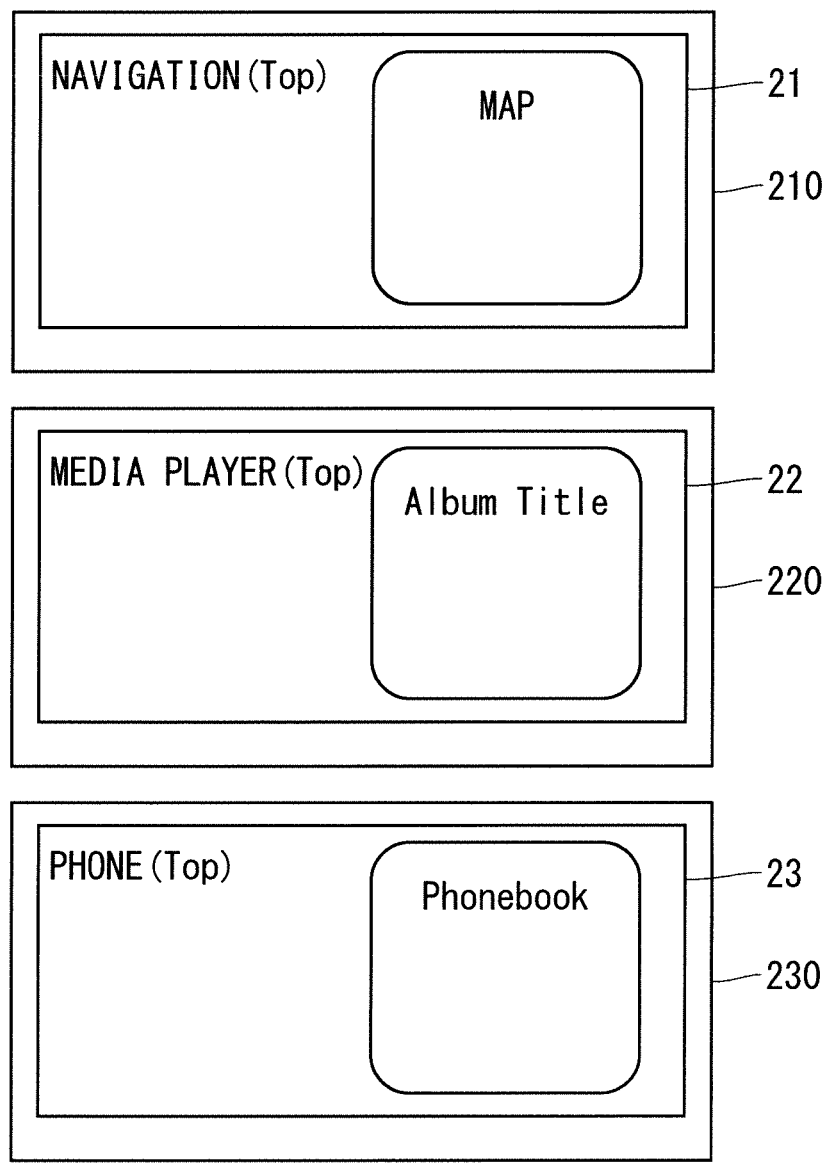
FIG. 29 shows a state of the top screens of the applications being displayed in the respective display regions in Embodiment 3.

Display control operation in Embodiment 3 will be described in accordance with the flowchart showing operation in response to the command speech shown in FIG. 14. Display control operation for a plurality of applications will be described herein. FIG. 29 shows a state of the top screens of the applications being displayed in the respective display regions.

In the step S100, the voice recognition unit 3 recognizes a spoken voice. The user herein says "Joe Smith". The voice recognition unit 3 recognizes "John Smith", "Josh Smith", "Joan Smith", and "Joe Smith" similar to the spoken voice as speech contents. Hereinafter, "John Smith" is referred to as the seventh speech content, "Joan Smith" is referred to as the eighth speech content, "Joe Smith" is referred to as the ninth speech content, and "Josh Smith" is referred to as the tenth speech content.

In the step S110, the voice recognition unit 3 references the database in which the speech contents prepared in advance, the first information, and the second information are associated, and outputs the first information and the second information related to the recognized speech contents. The voice recognition unit 3 references the database corresponding to the command speech shown in FIG. 11, and outputs the topic "NAV.navigateName" and the slot "John Smith" associated with "John Smith" as the seventh speech content. The voice recognition unit 3 similarly outputs the topic "MPL.playArtist" and the slot "Joan Smith" associated with "Joan Smith" as the eighth speech content. The voice recognition unit 3 outputs the topic "PHN.callName" and the slot "Joe Smith" associated with "Joe Smith"

as the ninth speech content. The voice recognition unit 3 outputs the three topics "NAV.navigateName", "MPL.playArtist", and "PHN.callName" and the slot "Josh Smith" associated with "Josh Smith" as the tenth speech content.

In the step S120, the display controller 1 acquires the first information and the second information output from the voice recognition unit 3. The display controller 1 herein acquires the topics and the slots.

In the step S130, the display controller 1 identifies, based on the first information, at least one application related to the speech contents. The display controller 1 identifies, based on the correspondence shown in FIG. 13, the applications related to the speech contents. The topic associated with the seventh speech content and the tenth speech content is "NAV.navigateName", so that the application is the navigation. The topic associated with the eighth speech content and the tenth speech content is "MPL.playArtist", so that the application is the media player. The topic associated with the ninth speech content and the tenth speech content is "PHN.callName", so that the application is the phone.

In the step S140, the display controller 1 identifies, based on the display region information, the display region to display the at least one application as identified. In Embodiment 3, the display controller 1 identifies, based on the display region information, the display regions to display the respective three applications. That is to say, the display controller 1 identifies, based on the display region information shown in FIG. 10, the first display region 21 in which the navigation is displayed, the second display region 22 in which the media player is displayed, and the third display region 23 in which the phone is displayed.

In the step S150, the display controller 1 identifies, based on the second information, at least one processing target in processing to be performed by the at least one application as identified. The at least one processing target is related to the speech contents. The display controller 1 herein identifies, based on the slots associated with the seventh speech content and the tenth speech content, the point corresponding to "John Smith" and the point corresponding to "Josh Smith" as the destinations set by the navigation. The display controller 1 identifies, based on the slots associated with the eighth speech content and the tenth speech content, the song corresponding to "Joan Smith" and the song corresponding to "Josh Smith" as the songs of the artists played by the media player. The display controller 1 identifies, based on the slots associated with the ninth speech content and the tenth speech content, the phone number corresponding to "Joe Smith" and the phone number corresponding to "Josh Smith" as the persons to be called by the phone.

In the step S160, the display controller 1 provides identification symbols to the respective processing targets. In this case, the display controller 1 provides identification symbols not overlapping one another to the respective processing targets. FIG. 30 shows a relationship between the processing targets and the identification symbols. The display controller 1 provides different ID numbers "1" to "6" to the respective processing targets. The display controller 1 provides the identification symbols in accordance with the degree of priority determined in advance for each of the display regions. The degree of priority is stored, for example, in the display region information, and the display controller 1 references the display region information. The degree of priority is set in advance, for example, in accordance with the location of each of the display regions in the vehicle. The degree of priority is set, for example, in descending order of level of the location of each of the display regions. Alternatively, the degree of priority is set, for example, in descending order of closeness to the driver's seat or the passenger's seat of each of the display regions. In Embodiment 3, the degree of priority is set in advance in the order of the first display region 21, the second display region 22, and the third display region 23.

In the step S170, the display controller 1 stores the relationship between the processing targets and the identification symbols. The display controller 1 stores, for example, a table in which the processing targets and the identification symbols are stored as shown in FIG. 30.

Figure 31:
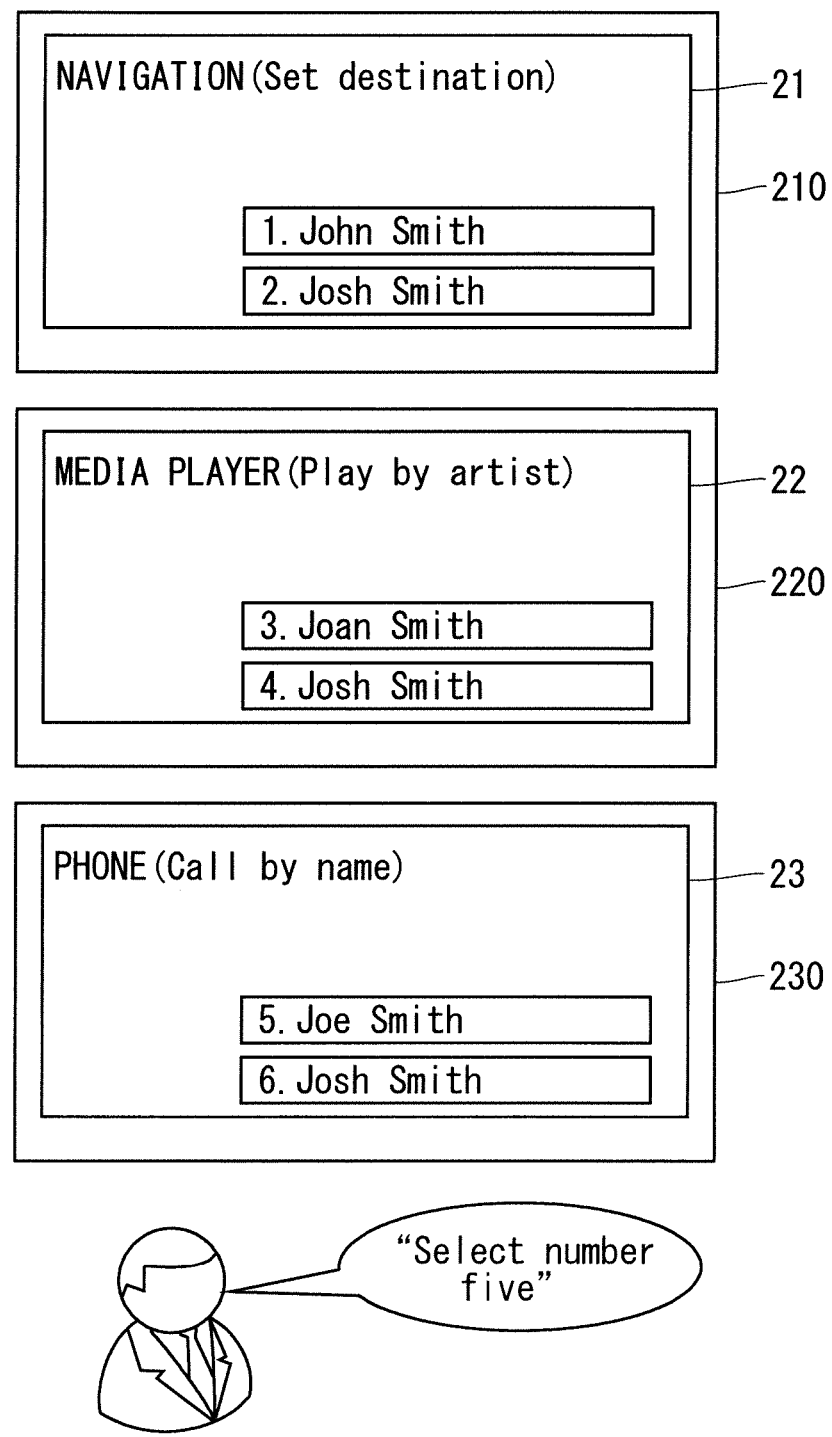
FIG. 31 shows a state of recognition candidates being displayed in the respective display regions in Embodiment 3.

In the step S180, the display controller 1 causes the processing targets to be displayed, along with the identification symbols, in the display regions to display the respective applications, as the recognition candidates. FIG. 31 shows a state of the recognition candidates being displayed in the respective display regions. The display controller 1 causes the slots "John Smith" and "Josh Smith" to be displayed, along with the ID numbers, in the first display region 21 as the recognition candidates. In this case, the navigation displays the screen to set the destination. The display controller 1 causes the slots "Joan Smith" and "Josh Smith" to be displayed, along with the ID numbers, in the second display region 22 as the recognition candidates. In this case, the media player displays the screen to play by artist. The display controller 1 causes the slots "Joe Smith" and "Josh Smith" to be displayed, along with the ID numbers, in the third display region 23 as the recognition candidates. In this case, the phone displays the screen to call by name.

Operation of the display control device 11 in response to the candidate selection speech will be described next in accordance with the flowchart shown in FIG. 18.

In the step S100, the voice recognition unit 3 recognizes a spoken voice. The user herein says "select number five" based on the recognition candidates shown in FIG. 31. The voice recognition unit 3 recognizes "select number five" in response to the speech.

In the step S110, the voice recognition unit 3 references the database in which the speech contents prepared in advance, the first information, and the second information are associated, and outputs the first information and the second information related to the recognized speech content. The voice recognition unit 3 references the database corresponding to the candidate selection speech shown in FIG. 12, and outputs the topic "CMD.selectNbest" and the slot "number five" associated with "select number five" as the speech content.

In the step S120, the display controller 1 acquires the first information and the second information output from the voice recognition unit 3. The display controller 1 herein acquires the topic and the slot.

In the step S230, the display controller 1 acquires, based on the first information, an identification symbol corresponding to the speech content from the second information. The display controller 1 acquires, based on the topic "CMD.selectNbest", an ID number corresponding to the slot "number five". In this case, "5" is acquired as the ID number.

In the step S240, the display controller 1 selects, based on the relationship between the processing targets and the identification symbols, a processing target corresponding to the speech content. The display controller 1 selects the slot "Joe Smith" corresponding to the spoken identification symbol based on the relationship between the processing targets and the identification symbols shown in FIG. 30. From the foregoing, the processing target in processing to be performed by the application is determined. That is to say, the phone number to be called by the phone is determined to be the phone number corresponding to "Joe Smith".

In the step S250, the display controller 1 asks the application to perform processing. The display controller 1 asks the phone to call the phone number corresponding to "Joe Smith".

Figure 32:
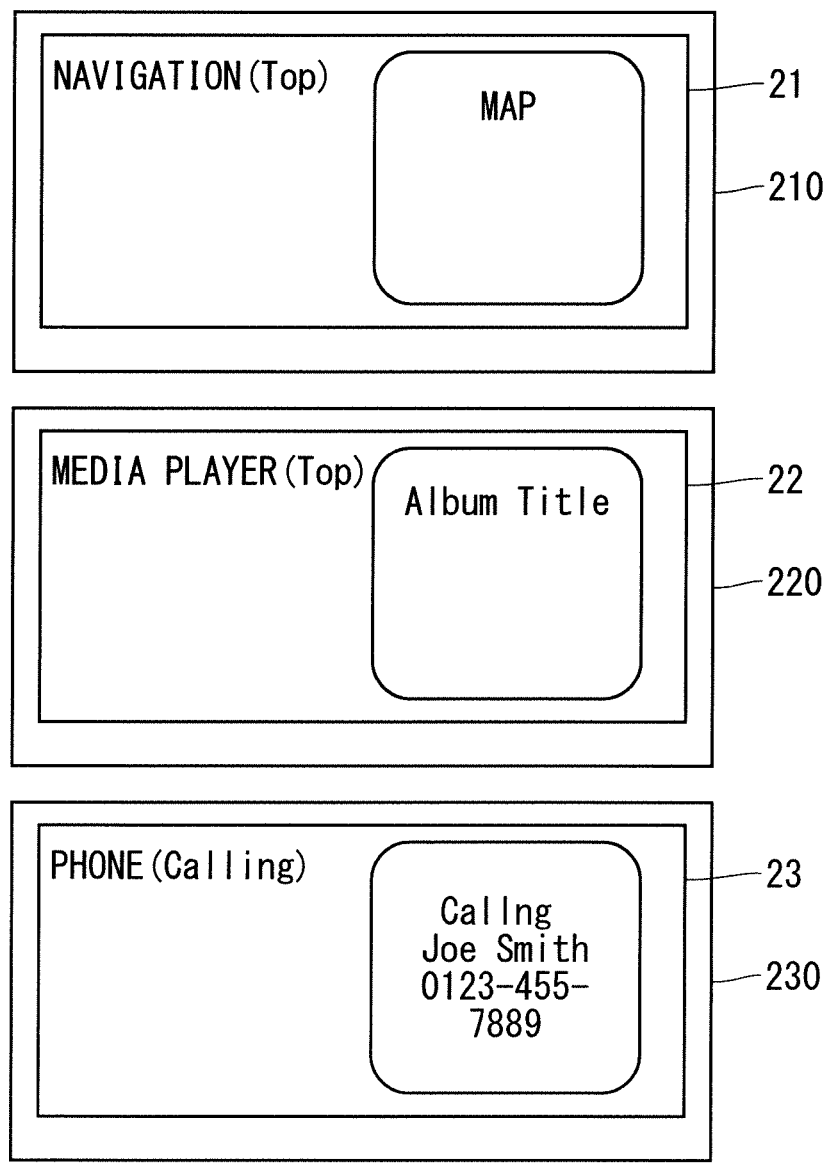
FIG. 32 shows a state of the screen during performance of processing being displayed in the third display region in Embodiment 3.

In the step S260, the display controller 1 causes the indication that the application is performing processing to be displayed in the display region to display the application. FIG. 32 shows a state of the screen during performance of processing being displayed in the third display region 23. In the third display region 23 to display the phone, the display controller 1 causes the information such as "Calling Joe Smith 0123-455-7889" as the information including the phone number corresponding to "Joe Smith" to be displayed. The display controller 1 causes the top screens to be displayed in the first display region 21 to display the navigation and the second display region 22 to display the media player in which the recognition candidates have not been selected.

When calling by the phone ends, the display control device 11 causes a top screen similar to that shown in FIG. 28 to be displayed in the third display region 23.

(Effects)

The speech content "Josh Smith" is related to the three applications: the navigation, the media player, and the phone. In this case, the recognition candidates are displayed in the display device 20 while being provided with different ID numbers. The display control device 11 thus allows the user to select one of the recognition candidates only by designating an ID number without designating an application.

In summary, in the display control device 11 in Embodiment 3, the at least one processing target identified based on the second information includes a plurality of processing targets. The display controller 1 provides the identification symbols not overlapping one another to the respective processing targets, and causes each of the processing targets to be displayed, along with each of the identification symbols, in the display region as the recognition candidate.

With such a configuration, the display control device 11 allows the user to select one of the recognition candidates displayed by the applications by designating an identification symbol.

The display controller 1 of the display control device 11 in Embodiment 3 provides the identification symbols to the respective processing targets in accordance with the degree of priority determined in advance for each of the display regions to display the recognition candidate.

With such a configuration, the display control device 11 can present, to the user, a recognition candidate having a high degree of priority from among the recognition candidates.

Embodiment 4

The display control device 11 and a display control method in Embodiment 4 will be described. Description on configurations and operation similar to those in the other embodiments will be omitted.

In Embodiment 4, the display regions to display the navigation and the media player are switched. The media player is displayed in the first display region 21 having the highest degree of priority, and the navigation is displayed in the second display region 22 having a lower degree of priority than the first display region 21.

Whether the display regions to display the applications have been switched is determined by the display region management unit 2 notifying the display controller 1 of the display region information. As a result of switching between display locations, the display control device 11 provides identification symbols preferentially to processing targets in processing to be performed by the media player displayed in the first display region 21. From among the processing targets, the display control device 11 provides the ID number "1" to the topic "MPL.playArtist" and the slot "Joan Smith", and provides the ID number "2" to the topic "MPL.playArtist" and the slot "Josh Smith".

Figure 33:
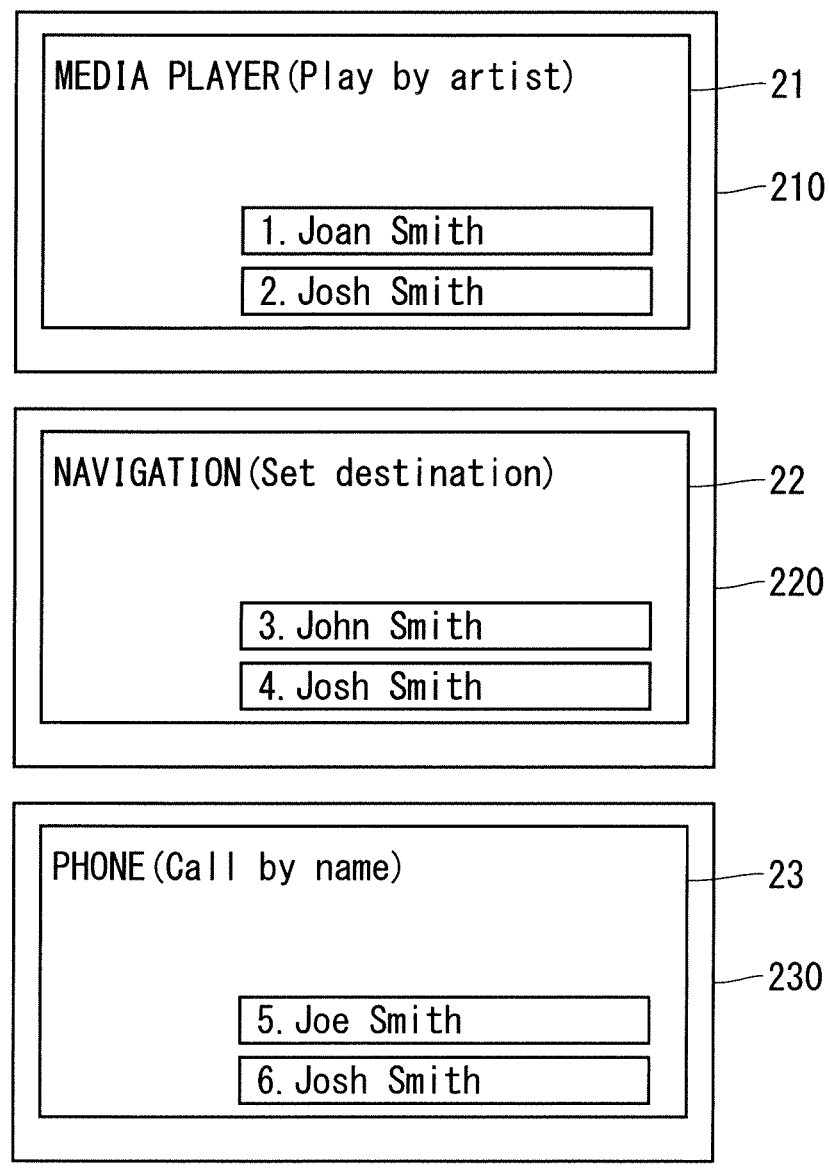
FIG. 33 shows a state of recognition candidates being displayed in the respective display regions in Embodiment 4.

FIG. 33 shows a state of the recognition candidates being displayed in the respective display regions in Embodiment 4. The display controller 1 causes the slots "Joan Smith" and "Josh Smith" to be displayed, along with the ID numbers, in the first display region 21 in which the media player is displayed as the recognition candidates. The display controller 1 causes the slots "John Smith" and "Josh Smith" to be displayed, along with the ID numbers, in the second display region 22 in which the navigation is displayed as the recognition candidates. The display controller 1 causes the slots "Joe Smith" and "Josh Smith" to be displayed, along with the ID numbers, in the third display region 23 in which the phone is displayed as the recognition candidates.

With such a configuration, even if the display locations of the applications are changed, the ID numbers provided to the recognition candidates displayed in the respective display regions are displayed in order in accordance with the degree of priority of each of the display regions. This facilitates selection of one of the recognition candidates by the user.

Embodiment 5

The display control device 11 and a display control method in Embodiment 5 will be described. Description on configurations and operation similar to those in the other embodiments will be omitted.

In Embodiment 5, the display controller 1 causes one of the processing targets having the highest acoustic reliability based on the speech content to be emphasized, as a recognition candidate, for display. The acoustic reliability refers to acoustic likelihood of the spoken voice recognized by the voice recognition unit 3. The processing target having high acoustic reliability is more likely to be the processing target intended by the user.

Figure 34:
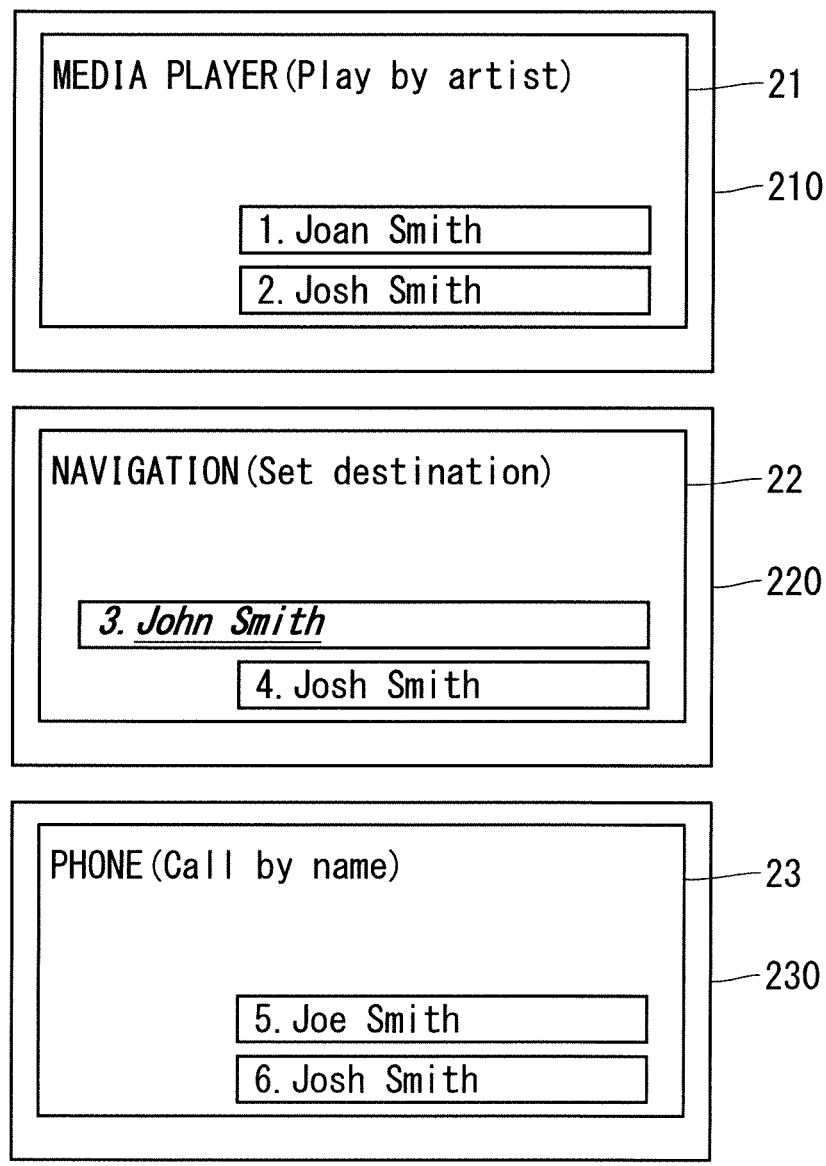
FIG. 34 shows a state of recognition candidates being displayed in the respective display regions in Embodiment 5.

FIG. 34 shows a state of the recognition candidates being displayed in the respective display regions in Embodiment 5. The display controller 1 causes a recognition candidate including "John Smith" having the highest acoustic reliability to be emphasized for display. The recognition candidate is emphasized for display, for example, by changing a size of display of the recognition candidate, changing a color of display of the recognition candidate, changing a typeface of display of the recognition candidate, decorating display of the recognition candidate with an underline and the like, changing a method of displaying the recognition candidate into italic type and the like, causing display of the recognition candidate to make an animated movement, changing the location of display of the recognition candidate, and changing an orientation of display of the recognition candidate. The display controller 1 acquires the acoustic reliability from the voice recognition unit 3. The display controller 1 acquires the acoustic reliability, for example, along with the first information and the second information.

With such a configuration, the display control device 11 can perform control to cause the display device 20 to display a recognition candidate more likely to match intention of the user.

Embodiment 6

The display control device 11 and a display control method in Embodiment 6 will be described. Description on configurations and operation similar to those in the other embodiments will be omitted. In each of the above-mentioned embodiments, an example in which the number of recognition candidates displayed in a single display region is two has been shown, but more recognition candidates can be displayed in a single display region depending on the speech content, names registered in the applications, and the like. When the number of recognition candidates is large, it is difficult to display them in a single display region, that is to say, on a single screen.

Figure 35:
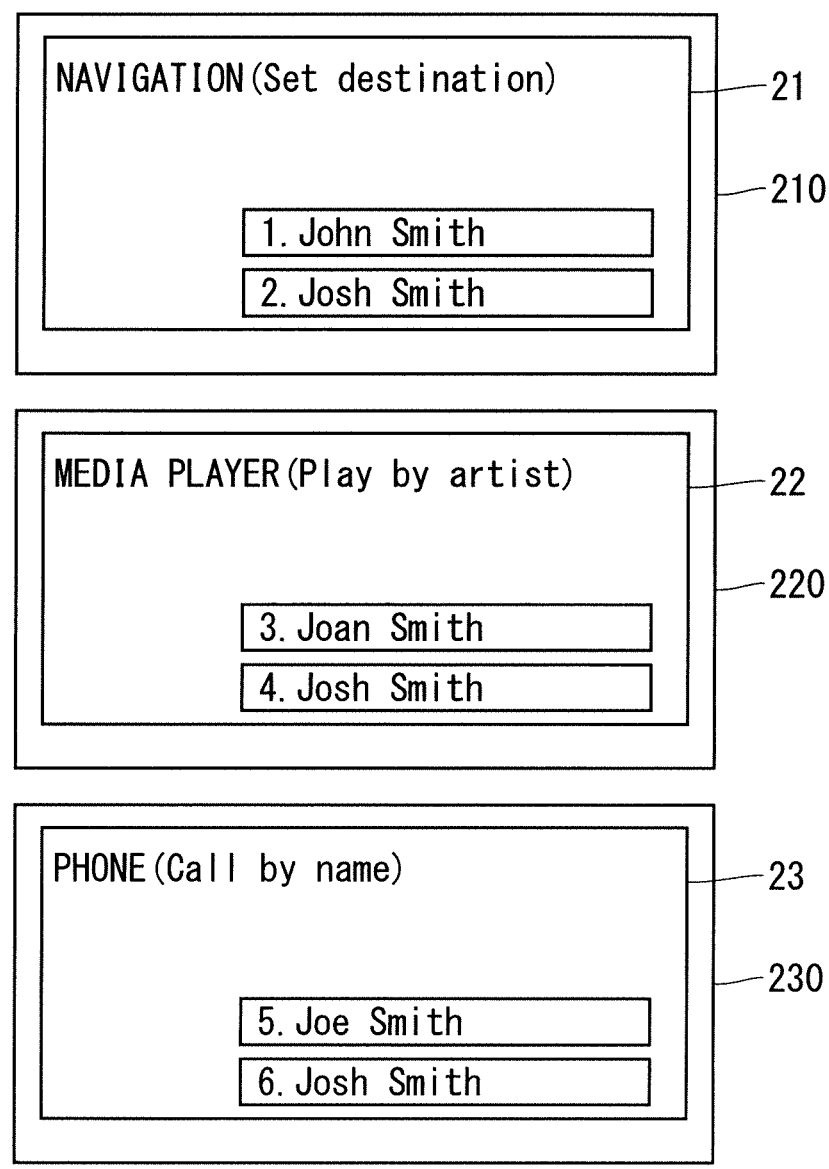
FIG. 35 shows a state of recognition candidates being displayed in the respective display regions in Embodiment 6.

In Embodiment 6, the at least one processing target caused by the display control device 11 to be displayed as the recognition candidate is within the upper limit of the number of recognition candidates to be displayed determined in advance for each of the display regions. FIG. 35 shows a state of the recognition candidates being displayed in the respective display regions in Embodiment 6. The upper limit of the number of recognition candidates to be displayed determined in advance for each of the display regions is herein two. Although the upper limits in the respective display regions herein have the same value, different upper limits may be set to the respective display regions. The recognition candidates are preferably displayed in the respective display regions in descending order of the acoustic reliability.

With such a configuration, the display control device 11 can prevent reduction in visibility when a plurality of recognition candidates are displayed.

Embodiment 7

Figure 36:
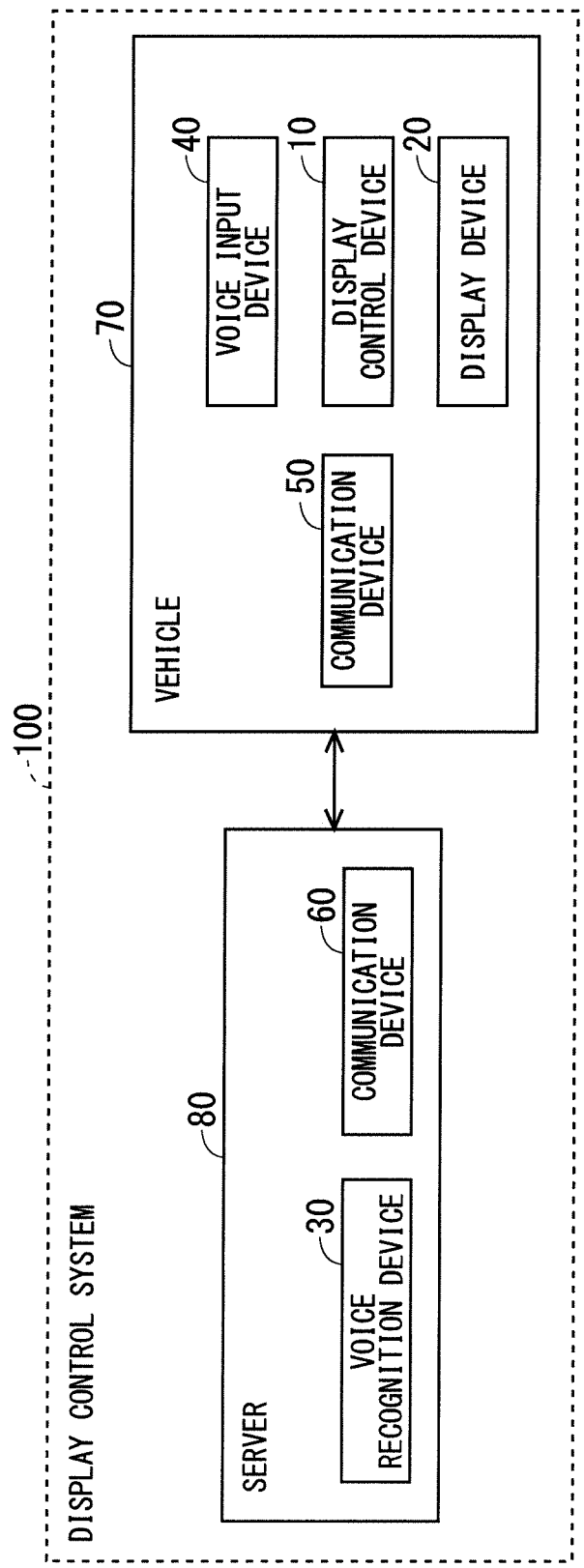
FIG. 36 is a block diagram showing a configuration of a display control system in Embodiment 7.

The display control device installed in the vehicle has been shown in each of the above-mentioned embodiments. In Embodiment 7, the display control device is applied to a system constructed by appropriately combining a communication terminal, a server, and functions of an application installed on them. FIG. 36 is a block diagram showing a configuration of a display control system 100 in Embodiment 7. When the display control device 10 is applied to the system, functions or components of the display control device 10 may be distributed among devices constituting the display control system 100. A vehicle 70 includes the display control device 10, the display device 20, the voice input device 40, and a communication device 50. The communication terminal herein includes, for example, a mobile terminal, such as a mobile phone, a smartphone, and a tablet. A server 80 includes the voice recognition device 30 and a communication device 60. Speech of the user input into the voice input device 40 is input into the voice recognition device 30 through the communication device 50 of the vehicle 70 and the communication device 60 of the server 80, and is recognized. The voice recognition device 30 outputs the first information and the second information to the display device 20 through the communication devices. The display control device 10 performs, based on the first information and the second information, the display control operation described in each of the embodiments on the display device 20. With such a configuration, the display control device 10 produces effects similar to the effects shown in each of the embodiments.

When the display control device includes the voice recognition unit 3 as the function of the voice recognition device 30 as shown in Embodiment 2 although illustration thereof is omitted, the functions of the display control device are distributed between the vehicle 70 and the server 80. That is to say, the function of the display controller 1 is distributed to the vehicle 70, and the function of the voice recognition unit 3 is distributed to the server 80. With such a distributed configuration, the display control device produces effects similar to the effects shown in each of the embodiments. A configuration of a device installed in the vehicle 70 can be simplified by providing a configuration of a part of the display control device to the server 80. Updates and the like of the database used by the voice recognition unit 3 to recognize voices can easily be performed, so that the accuracy of the speech content, that is, the acoustic reliability can be improved.

Embodiments of the present invention can freely be combined with each other, and can be modified or omitted as appropriate within the scope of the invention.

While the invention has been described in detail, the foregoing description is in all aspects illustrative and not restrictive. It is understood that numerous modifications not having been described can be devised without departing from the scope of the present invention.

EXPLANATION OF REFERENCE SIGNS

1 display controller, 2 display region management unit, 3 voice recognition unit, 4 storage unit, 10 display control device, 20 display device, 21 first display region, 22 second display region, 23 third display region, 100 display control system.

The invention claimed is:

1. A display control device to perform, on a display device having display regions in which a plurality of applications each are displayed, display control based on a speech content of a spoken voice, the display control device comprising:
    a processor to execute a program; and
    a memory to store the program which, when executed by the processor, causes the processor to perform processes of
        acquiring first information and second information, the first information allowing identification of applications related to the speech content from among the plurality of applications, the second information allowing identification of a plurality of processing targets to be potentially processed by the applications, the plurality of processing targets being related to the speech content, and
        performing control to cause the display device to simultaneously display, in different ones of the display regions each displaying a corresponding one of the applications identified based on the first information, respective textual lists of recognition candidates determined according to recognition of the spoken voice,
    wherein each of the textual lists includes as a recognition candidate at least one of the plurality of processing targets to be potentially processed by the corresponding one of the applications.

2. The display control device according to claim 1, wherein
    the processes performed by the processor further include recognizing the spoken voice,
referencing a database in which the speech content acquired by recognizing the spoken voice, the first information, and the second information are associated, and
outputting the first information and the second information related to the speech content, and
the memory stores the database.

3. The display control device according to claim 1, wherein
the processes performed by the processor further include
managing display region information representing a correspondence between the applications and the display regions to display the respective applications, and
identifying, based on the display region information, a display region to display the at least one application identified based on the first information.

4. The display control device according to claim 1, wherein
the processes performed by the processor further include
providing identification symbols not overlapping one another to the respective processing targets, and
causing each of the plurality of processing targets to be displayed, along with each of the identification symbols, in the corresponding display region as a recognition candidate.

5. The display control device according to claim 4, wherein
the processes performed by the processor further include
providing the identification symbols to the respective processing targets in accordance with a degree of priority determined in advance for each of the display regions to display the recognition candidate.

6. The display control device according to claim 1, wherein
the processes performed by the processor further include
calculating acoustic reliabilities for the respective plurality of processing targets, each acoustic reliability representing a likelihood that the corresponding one of the plurality of processing targets was correctly recognized from the spoken voice; and
causing the one of the plurality of processing targets having the highest acoustic reliability to be displayed as an emphasized recognition candidate relative to the other recognition targets displayed in the textual lists.

7. A display control device to perform, on a display device having display regions in which a plurality of applications each are displayed, display control based on a speech content of a spoken voice, the display control device comprising:
a processor to execute a program; and
a memory to store the program which, when executed by the processor, causes the processor to perform processes of
acquiring first information and second information, the first information allowing identification of at least one application related to the speech content from among the plurality of applications, the second information allowing identification of at least one processing target in processing to be performed by the at least one application, the at least one processing target being related to the speech content, and
performing control to cause the display device to display, in one of the display regions to display one application identified based on the first information, processing targets in processing to be performed by the one application as recognition candidates, the processing targets being identified based on the second information, or to cause the display device to display, in two or more of the display regions to respectively display two or more applications identified based on the first information, at least one processing target in processing to be performed by each of the two or more applications as a recognition candidate, the at least one processing target being identified based on the second information, wherein
the processes performed by the processor further include
causing the at least one processing target to be displayed as the recognition candidate within an upper limit of the number of recognition candidates to be displayed determined in advance for each of the display regions.

8. A display control method of performing, on a display device having display regions in which a plurality of applications each are displayed, display control based on a speech content of a spoken voice, the display control method comprising:
acquiring first information and second information, the first information allowing identification of applications related to the speech content from among the plurality of applications, the second information allowing identification of a plurality of processing targets to be potentially processed by the at least one application, the plurality of processing targets being related to the speech content; and
performing control to cause the display device to simultaneously display, in different ones of the display regions each displaying a corresponding one of the applications identified based on the first information, respective textual lists of recognition candidates determined according to recognition of the spoken voice,
wherein each of the textual lists includes as a recognition candidate at least one of the plurality of processing targets to be potentially processed by the corresponding one of the applications.

* * * * *